United States Patent
Hirota et al.

(10) Patent No.: US 9,019,418 B2
(45) Date of Patent: Apr. 28, 2015

(54) IMAGE PICKUP APPARATUS, INCLUDING A FIXING MEMBER, AND HAVING IMAGE PICKUP DEVICE PACKAGE MOUNTED THEREON

(71) Applicant: Canon Kabushiki Kaisha, Tokyo (JP)

(72) Inventors: Norikazu Hirota, Chigasaki (JP); Yutaka Takase, Tokyo (JP)

(73) Assignee: Canon Kabushiki Kaisha (JP)

( * ) Notice: Subject to any disclaimer, the term of this patent is extended or adjusted under 35 U.S.C. 154(b) by 118 days.

(21) Appl. No.: 13/721,146

(22) Filed: Dec. 20, 2012

(65) Prior Publication Data

US 2013/0162893 A1    Jun. 27, 2013

(30) Foreign Application Priority Data

Dec. 22, 2011    (JP) .................................. 2011-281486

(51) Int. Cl.
*H04N 5/225*    (2006.01)

(52) U.S. Cl.
CPC ............. *H04N 5/225* (2013.01); *H04N 5/2251* (2013.01)

(58) Field of Classification Search
USPC ........................................................ 348/335
See application file for complete search history.

(56) References Cited

U.S. PATENT DOCUMENTS

| 7,253,976 | B2 * | 8/2007 | Umezu et al. ................. 359/824 |
| 2004/0027476 | A1 * | 2/2004 | Masuda ........................ 348/335 |
| 2005/0238347 | A1 * | 10/2005 | Oh ................................ 396/449 |
| 2009/0040360 | A1 * | 2/2009 | Taniguchi ..................... 348/335 |

FOREIGN PATENT DOCUMENTS

| JP | 05-292380 A |   | 11/1993 |
| JP | 2005195737 A | * | 7/2005 |

* cited by examiner

*Primary Examiner* — Twyler Haskins
*Assistant Examiner* — Dwight C Tejano
(74) *Attorney, Agent, or Firm* — Rossi, Kimms & McDowell LLP

(57) ABSTRACT

A mechanism enabling reduction of the size of a structure for mounting an image pickup device without affecting the amount of movement of an optical system even when screw insertion holes of a sensor plate are arranged closer to the optical axis. The sensor plate of an image pickup apparatus is mounted to a lens barrel with screws, and includes an attachment surface to which the image pickup device is attached and contact surfaces which are fixed to the lens barrel. The attachment surface is protruded from the contact surfaces. By bringing the attachment surface to the lens barrel in the optical axis direction, the device has an image pickup surface positioned with respect to the lens barrel in the optical axis direction. The sensor plate has an opening formed between the attachment surface and each contact surface, for absorbing deformation of the sensor plate.

4 Claims, 25 Drawing Sheets

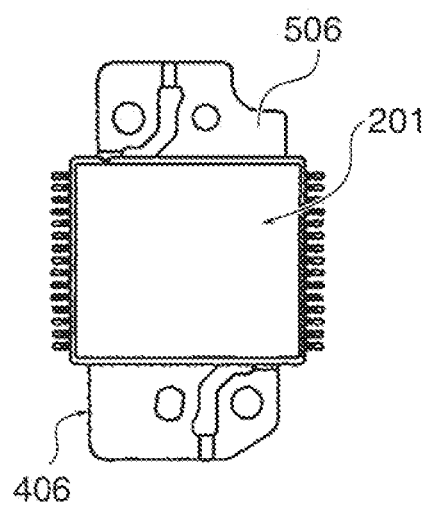
FIG.6A
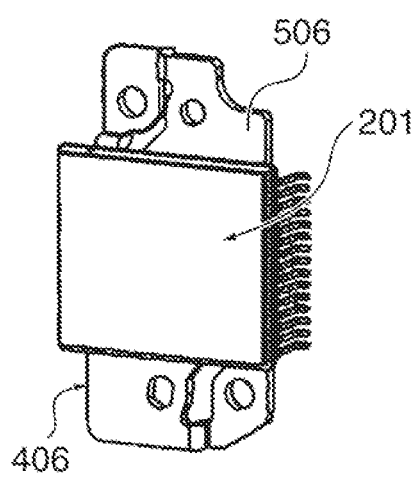
FIG.6B
FIG.6C
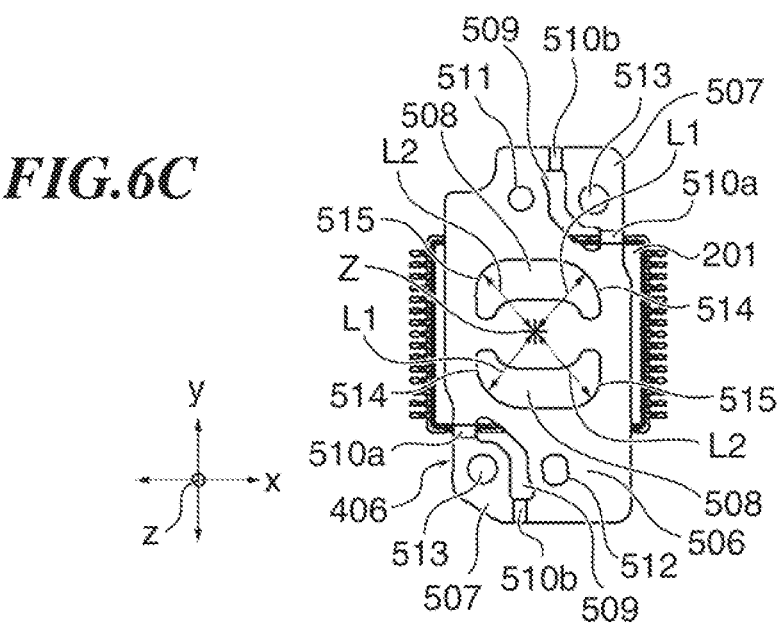

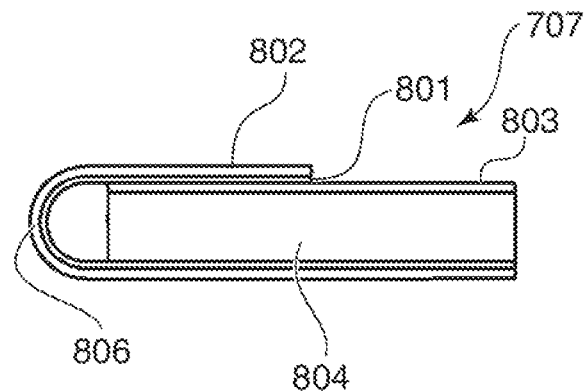
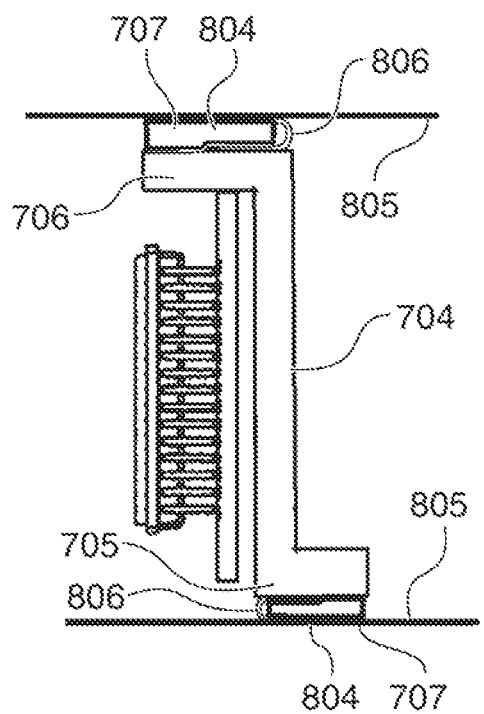

IMAGE PICKUP APPARATUS, INCLUDING A FIXING MEMBER, AND HAVING IMAGE PICKUP DEVICE PACKAGE MOUNTED THEREON

BACKGROUND OF THE INVENTION

1. Field of the Invention

The present invention relates to an image pickup apparatus, such as a digital video camera, and more particularly to an image pickup apparatus having an image pickup device package mounted thereon.

2. Description of the Related Art

To reduce the size of a digital video camera, for example, it is necessary to make compact a structure for mounting an image pickup device package, which is a factor for increasing the size of a lens barrel. Conventionally, there has been proposed an image pickup apparatus which has a plate-shaped sensor plate having an image pickup device package fixed thereon, mounted on a lens barrel thereof with screws (see Japanese Patent Laid-Open Publication No. H05-292380).

However, as in the mechanism disclosed in Japanese Patent Laid-Open Publication No. H05-292380, when the plate-shaped sensor plate is fixed to the lens barrel with screws, portions of the sensor plate where screw insertion holes are formed, respectively, bite into the lens barrel, which may affect the amount of movement of the optical system. For this reason, it is necessary to arrange the screw insertion holes of the sensor plate at respective locations spaced in a direction of the diameter of the lens barrel from the optical axis. This increases the size of the structure of the image pickup device package, causing an increase in the size of the lens barrel, and in turn an increase in the size of the image pickup apparatus.

SUMMARY OF THE INVENTION

The present invention provides a mechanism which makes it possible to reduce the size of a structure for mounting an image pickup device package without affecting the amount of movement of an optical system even when screw insertion holes of a sensor plate are arranged closer to the optical axis.

In an aspect of the present invention, there is provided an image pickup apparatus comprising a lens barrel, an image pickup device package configured to convert an optical image having passed through an optical system of the lens barrel to an electric signal, and a fixing member configured to have the image pickup device package attached thereto, and be fixed to the lens barrel, wherein the fixing member has an attachment surface to which the image pickup device package is attached and fixing surfaces which are fixed to the lens barrel, formed thereon, the attachment surface being formed such that the attachment surface is protruded from the fixing surfaces, wherein the attachment surface is brought into abutment with the lens barrel to thereby have the fixing member positioned in an optical axis direction, and the fixing surfaces are fixed to the lens barrel, and wherein the fixing member has a first opening formed between the attachment surface and each fixing surface, for absorbing deformation of the fixing member.

According to the present invention, even when the screw insertion holes of the sensor plate are arranged close to the optical axis, this does not affect the amount of movement of the optical system. Therefore, it is possible to reduce the size of a structure for mounting the image pickup device package, and this makes it possible to reduce the size of the lens barrel, and in turn reduce the size of the image pickup apparatus.

Further features of the present invention will become apparent from the following description of exemplary embodiments with reference to the attached drawings.

BRIEF DESCRIPTION OF THE DRAWINGS

FIG. 6A is a front view of the sensor plate having the image pickup device bonded thereto.

FIG. 6B is a perspective view of FIG. 6A.

FIG. 6C is a rear view of FIG. 6A.

FIG. 10A is a schematic view of an elastic conductive heat release member.

FIG. 10B is a schematic view showing a relationship between the heat sink arms of the heat sink, the elastic conductive heat release members, and the peripheral structural members.

DESCRIPTION OF THE EMBODIMENTS

The present invention will now be described in detail below with reference to the accompanying drawings showing embodiments thereof.

Figure 1:
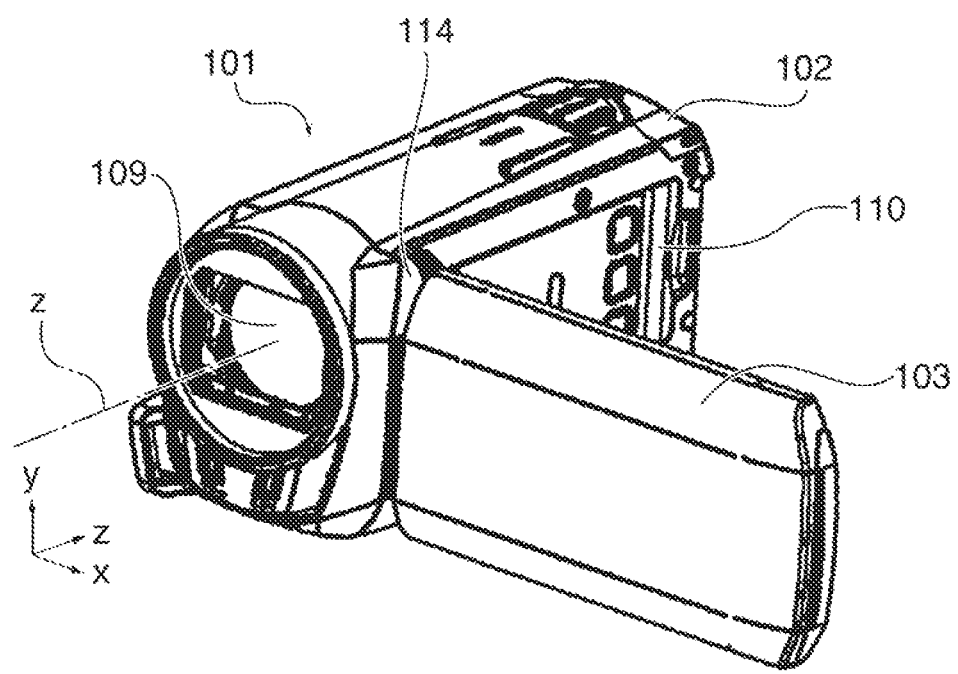
FIG. 1 is a perspective view of the appearance of a digital video camera as an image pickup apparatus according to an embodiment of the present invention.

FIG. 1 is a perspective view of the appearance of a digital video camera 101 as an image pickup apparatus according to an embodiment of the present invention. In FIG. 1, the z-axis indicates a front-rear direction of a camera body 102, and a near side of the drawing is defined as a front end side, and a far side of the drawing is defined as a rear end side. Further, the z-axis corresponds to a shooting optical axis of the camera body 102, the y-axis corresponds to a vertical direction of the camera body 102, the x-axis corresponds to a left-right direction of the camera body 102, and a side surface on the right side and a side surface on the left side of the camera body 102 in the x-axis direction as viewed from the front end are defined as a right-side surface and a left-side surface, respectively.

As shown in FIG. 1, the digital video camera 101 according to the present embodiment includes the camera body 102, and a lens barrel 109 is arranged inside an opening formed in the front end of the camera body 102. Further, a display unit 103 is supported on the right-side surface of the camera body 102 such that it is pivotal about a biaxial hinge portion 114 in an opening/closing direction, and is vertically rotatable in the opened state. A memory card inlet 110 is formed in a rear portion of the right-side surface of the camera body 102.

Figure 2A:
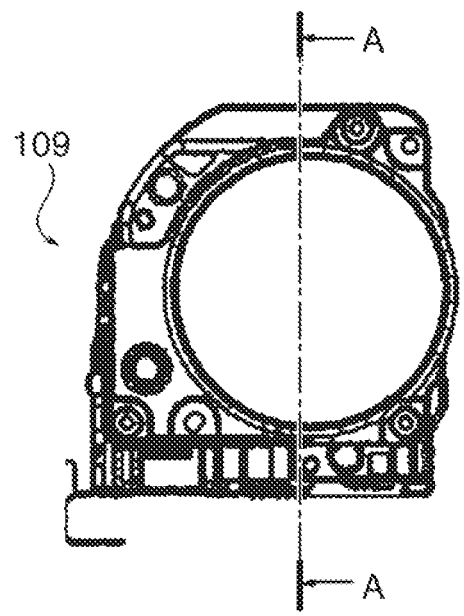
FIG. 2A is a front view of a lens barrel, as viewed from a front end side of a camera body.
Figure 2B:
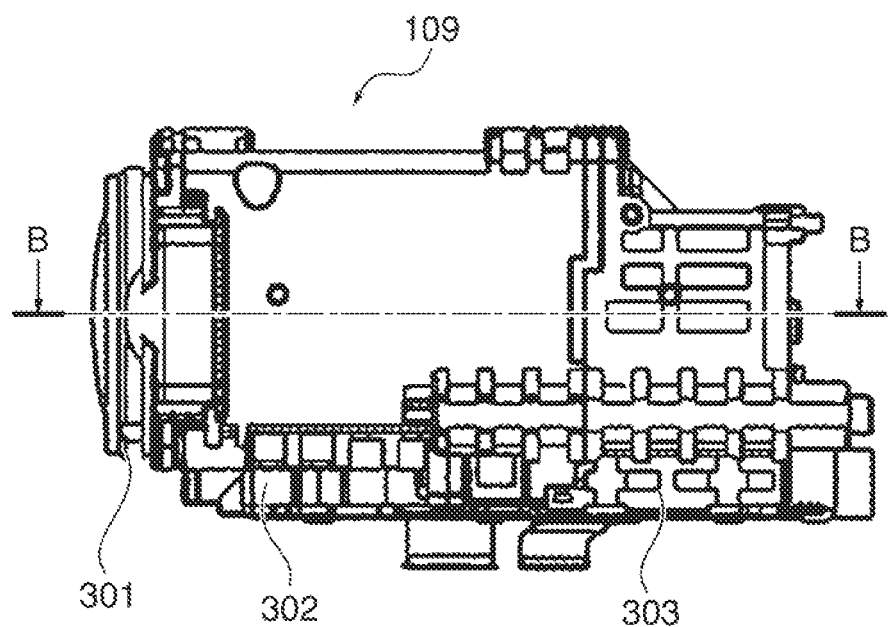
FIG. 2B is a right side view of the lens barrel shown in FIG. 2A.
Figure 3A:
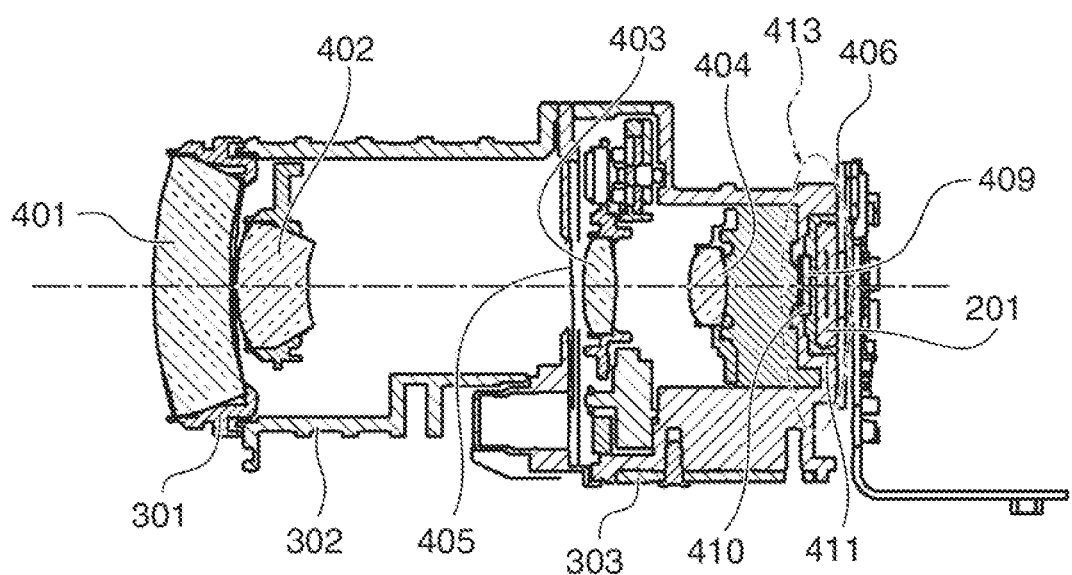
FIG. 3A is a cross-sectional view taken along A—A of FIG. 2A.

FIG. 2A is a view of the lens barrel 109, as viewed from the front end of the camera body 102, and FIG. 2B is a right side view of the lens barrel 109 shown in FIG. 2A. FIG. 3A is a cross-sectional view taken along A—A of FIG. 2A, and FIG. 3B is a cross-sectional view taken along B—B of FIG. 2B.

In the present embodiment, the lens barrel 109 employs the inner focusing method, and a first-group lens 401, a second-group lens 402, an image stabilizer lens 403, and an afocal lens 404 are arranged along the optical axis from an object side toward an image pickup surface. An image pickup device package 201 that converts an optical image formed after passing through a lens optical system to an electric signal is disposed rearward of the afocal lens 404. The first-group lens 401 and the image pickup device package 201 are fixed at respective locations, and the second-group lens 402 and the afocal lens 404 move in the optical axis direction to thereby perform a zooming operation and a focusing operation.

More specifically, the first-group lens 401 is fixed to a fixed barrel 301, the second-group lens 402 is held by a second barrel 302 in a manner movable in the optical axis direction, and an aperture unit 405 is disposed rearward of the second barrel 302. The image stabilizer lens 403 is held by an image stabilizer actuator, at a location rearward of the aperture unit 405, in a manner movable in a direction orthogonal to the optical axis, and the afocal lens 404 is disposed rearward of the image stabilizer lens 403. The afocal lens 404 is disposed in a manner movable in the optical axis direction within a third barrel 303, and further, a sensor plate 406 having the image pickup device package 201 bonded and fixed thereto is mounted to the third barrel 303.

Figure 3B:
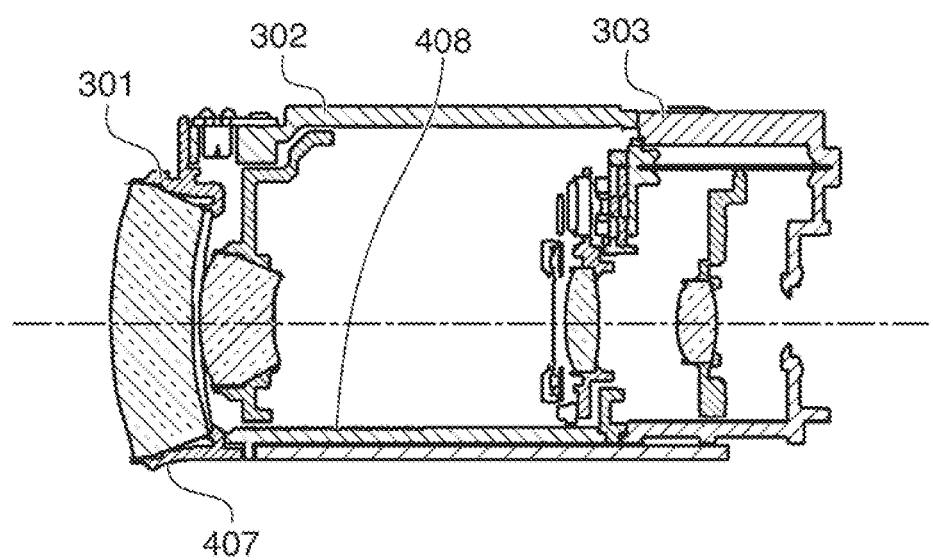
FIG. 3B is a cross-sectional view taken along B—B of FIG. 2B.

The first-group lens 401 is reduced in diameter toward the rear thereof as shown in FIGS. 3A and 3B, and a right side wall of the fixed barrel 301 located close to the right-side surface of the camera body 102 is formed with an arc-shaped cutout 407 formed about an axis parallel to the y-axis.

Further, the right side wall of the second barrel 302 located close to the right-side surface of the camera body 102 is in contact with the right side wall of the fixed barrel 301 formed with the cutout 407 in the optical axis direction, and an inner surface of the right side wall of the second barrel 302 is formed with a light-blocking shaped part 408 for prevention of reflection. In the present embodiment, the right side wall of the second barrel 302 is located closer to the optical axis, which makes it possible to reduce the camera body 102 in size. Further, by locating the right side wall of the second barrel 302 closer to the optical axis, flare and ghost due to reflection of undesired light on an inner surface of the lens barrel 109 are liable to occur, but the light-blocking shaped part 408 blocks the reflected light to thereby reduce flare and ghost.

The third barrel 303 has a front part in the optical axis direction used as a movement region where the afocal lens 404 is moved, and a rear part used as an attachment area 413 where the image pickup device package 201 is attached. In the attachment area 413, there are provided a holder 410 for holding an infrared absorption glass 409, a holder 411 for holding the image pickup device package 201, and an attachment part to which the sensor plate 406 is attached.

Figure 4A:
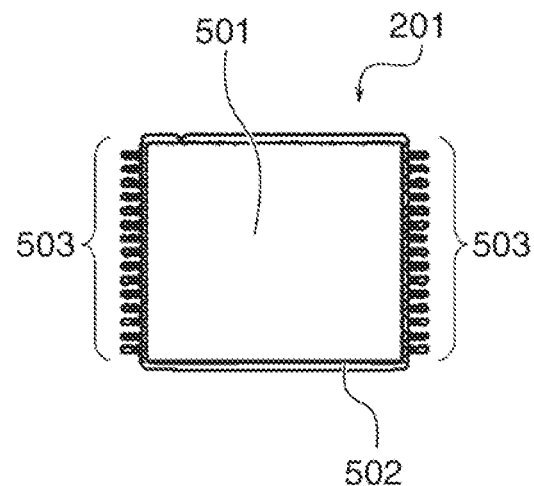
FIG. 4A is a front view of an image pickup device.
Figure 4B:
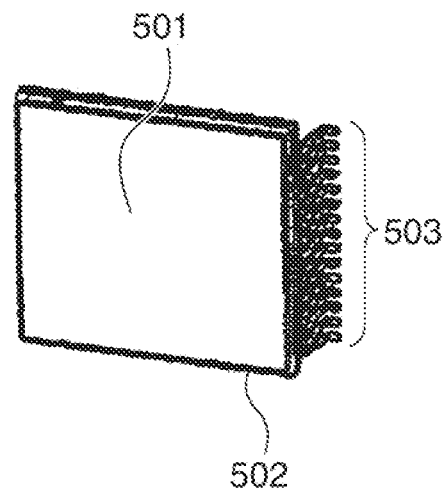
FIG. 4B is a perspective view of the image pickup device.
Figure 4C:
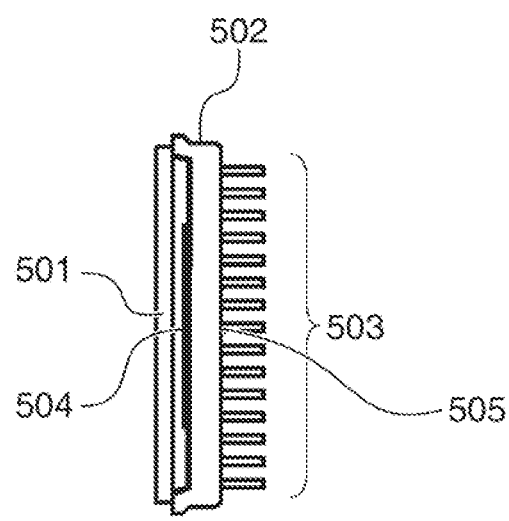
FIG. 4C is a cross-sectional view of the image pickup device.
Figure 5A:
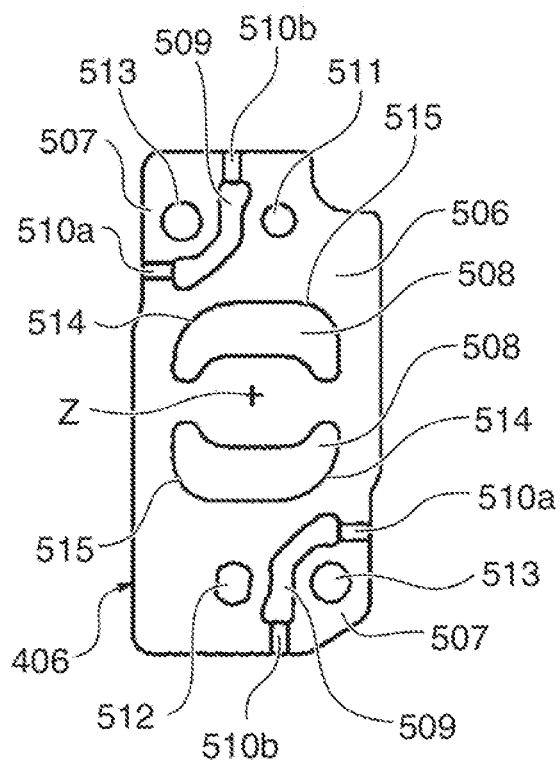
FIG. 5A is a front view of a sensor plate.

FIG. 4A is a front view of the image pickup device package 201, FIG. 4B is a perspective view of the image pickup device package 201, and FIG. 4C is a cross-sectional view of the image pickup device package 201. FIG. 5A is a front view of the sensor plate 406, and FIG. 5B is a perspective view of the sensor plate 406.

As shown in FIGS. 4A to 4C, the image pickup device package 201 includes a protective glass 501, a base member 502, leads 503, and an image pickup device 504. The image pickup device 504 is mounted on the base member 502. The rear side of the image pickup device package 201 is formed with an attachment surface 505 to which the sensor plate 406 is attached.

Figure 5B:
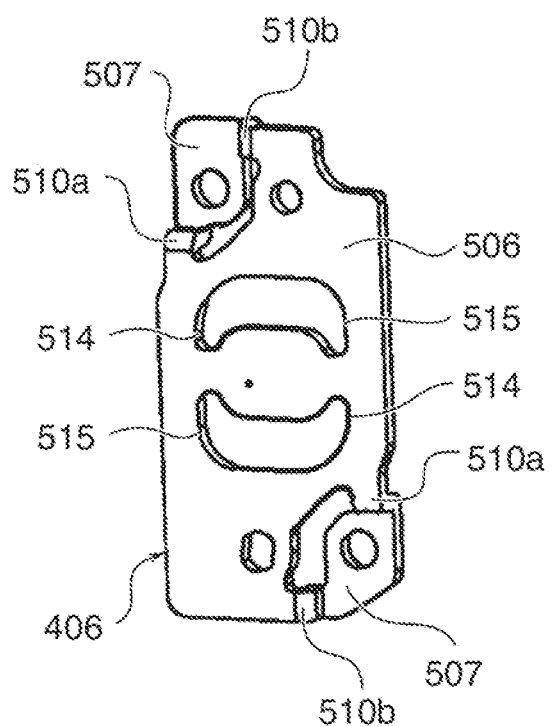
FIG. 5B is a perspective view of the sensor plate.

As shown in FIGS. 5A and 5B, the sensor plate 406 includes an attachment surface 506 to which the image pickup device package 201 is attached, and a plurality of contact surfaces 507 (two in FIGS. 5A and 5B) having a step (level difference) backward in the optical axis direction.

Further, two step connection portions 510a and 510b are formed between each contact surface 507 and the attachment surface 506. The attachment surface 506 of the sensor plate 405 is formed with adhesive filling holes 508, a positioning hole 511, and a rotation stopper hole 512, each contact surface 507 is formed with a screw insertion hole 513, and a deformation preventing hole 509 is formed between the step connection portions 510a and 510b. The screw insertion holes 513 formed in the two contact surfaces 507, respectively, are arranged at substantially the same distance from the center of the image pickup device package 201 at respective opposite locations.

Figure 7A:
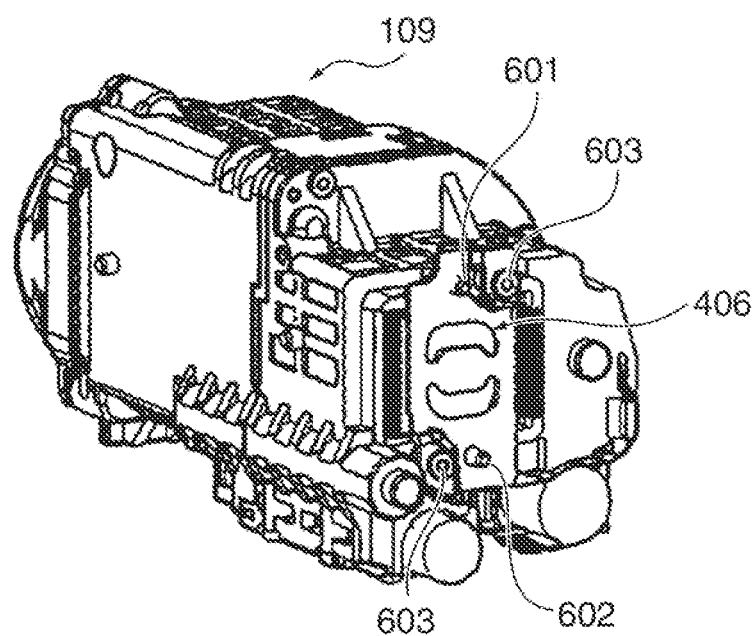
FIG. 7A is a perspective view showing a state where the sensor plate having the image pickup device bonded thereto has been mounted to a third barrel of the lens barrel with screws.
Figure 7B:
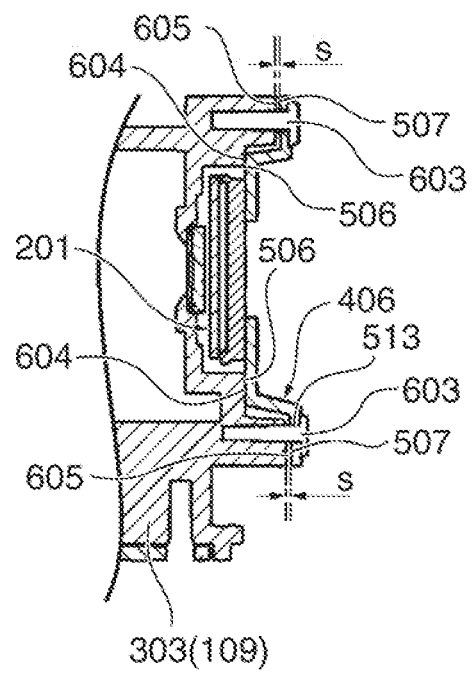
FIG. 7B is a cross-sectional view of essential portions of a structure part in which the sensor plate having the image pickup device bonded thereto has been mounted to the third barrel of the lens barrel.

FIG. 6A is a front view of the sensor plate 406 to which the image pickup device package 201 has been bonded, FIG. 6B is a perspective view of FIG. 6A, and FIG. 6C is a rear view of FIG. 6A. FIG. 7A is a perspective view showing a state where the sensor plate 406 having the image pickup device package 201 bonded thereto has been mounted to the third barrel 303 of the lens barrel 109 with screws, and FIG. 7B is a cross-sectional view of essential portions of a structure part where the sensor plate 406 having the image pickup device package 201 bonded thereto has been mounted to the third barrel 303 of the lens barrel 109.

The sensor plate 406 is a member for positioning and fixing the image pickup device package 201 to the third barrel 303. The image pickup device package 201 is positioned with reference to the positioning hole 511 of the sensor plate 406, and the image pickup device package 201 and the sensor plate 406 are bonded to each other. That is, in a state where the attachment surface 505 of the image pickup device package 201 and the attachment surface 506 of the sensor plate 406 are brought into contact with each other, adhesive is filled in the adhesive filling holes 508 whereby the image pickup device package 201 and the sensor plate 406 are bonded to each other.

Then, a positioning boss 601 and a rotation stopper boss 602 of the third barrel 303 are fitted in the positioning hole 511 and the rotation stopper hole 512, respectively, and tap screws 603 inserted through the screw insertion holes 513, respectively, are screwed into the third barrel 303. This fixes the sensor plate 406 to the third barrel 303. The optical axis of the lens barrel 109 and the image pickup surface of the image pickup device package 201 are positioned in the optical axis direction by bringing an exposed area of the attachment surface 506 of the sensor plate 406, where the image pickup device package 201 is not attached, into abutment with a contact surface 604 of the third barrel 303.

By the way, since there is the step between the attachment surface 506 and each contact surface 507 of the sensor plate 406, it is difficult to bring both of the attachment surface 506 and the contact surfaces 507 into abutment with the third barrel 303 in the initial state (a state before screwing) because of processing accuracy of mass production of parts.

Further, in a dimensional relationship in which only the contact surfaces 507 are brought into abutment with the third barrel 303, a gap is produced between the contact surface 604 of the third barrel 303 and the attachment surface 506 of the sensor plate 406. This affects the distance relationship in the optical axis direction between the optical axis of the lens barrel 109 and the image pickup surface of the image pickup device package 201.

In the present embodiment, the contact surface 604 of the third barrel 303 is necessarily brought into abutment with the attachment surface 506 of the sensor plate 406. For this reason, a dimension S (see FIG. 7B) of a gap between each contact surface 507 of the sensor plate 406 and a screw hole-formed surface 605 of the third barrel 303 is set to have a dimension tolerance of S≤0.

Therefore, even when the sensor plate 406 is fixed to the third barrel 303 with screws, and the portion of each screw insertion hole 513 of the sensor plate 406 bites into the third barrel 303, it is possible to prevent this from affecting the amount of movement of the optical system. As a consequence, it is possible to arrange the screw insertion holes 513 of the sensor plate 406 closer to the optical axis z, which makes it possible to reduce the size of a structure for mounting the image pickup device package 201.

On the other hand, when the sensor plate 406 is mounted to the third barrel 303 by the tap screws 603, with the dimension tolerance of S>0, the contact surfaces 507 of the sensor plate 406 are deformed, and if the deformation reaches the adhesive filling holes 508, this may reduce adhesive strength, whereby the sensor plate 406 may be peeled off.

To prevent this problem, as mentioned above, the deformation preventing hole 509 is formed between each two step connection portions 510a and 510b of the sensor plate 406 whereby the step connection portions 510a and 510b are arranged at respective locations away from the adhesive filling holes 508. As shown in FIG. 6C, a portion 514 of each adhesive filling hole 508 close to the step connection portions 510a and 510b is formed to have an arc-shape having a curvature radius larger than that of a portion 515 far from the step connection portions 510a and 510b. This makes it possible to prevent the deformation of the step connection portions 510a and 510b from reaching the adhesive filling holes 508 while securing the adhesive filling area.

That is, a distance L1 between the portion 514 of each adhesive filling hole 508 close to the step connection portions 510a and 510b and the center (optical axis z) of the image pickup device package 201 is shorter than a distance L2 between the portion 515 of the same far from the step connection portions 510a and 510b and the center of the image pickup device package 201.

Further, the step connection portion 510a is formed along the x-axis direction, the step connection portion 510b is formed along the y-axis direction, and the deformation preventing hole 509 is formed between the two the step connection portions 510a and 510b. Further, the deformation preventing hole 509 is formed such that the step connection portion 510a is arranged at a location away from the center of the screw insertion hole 513 in the y-axis direction toward the optical axis z, and the step connection portion 510b is arranged at a location away from the center of the screw insertion hole 513 in the x-axis direction toward the optical axis z. Note that the step connection portion 510a corresponds to an example of a first step connection portion in the present invention, and the step connection portion 510b corresponds to an example of a second step connection portion in the present invention.

As described above, the two step connection portions 510a and 510b are formed in the two directions of the x-axis direction and the y-axis direction orthogonal to the optical axis z, whereby the step connection portions 510a and 510b restrict component elements which are deformed in respective rotational directions about the x-axis and the y-axis, respectively. As a consequence, when the tap screws 603 inserted through the screw insertion holes 513, respectively, are screwed into the screw hole-formed surface 605, causing deformation of the contact surfaces 507 with respect to the screw hole-formed surface 605, it is possible to make the contact surfaces 507 easy to translate along the optical axis z.

Figure 8A:
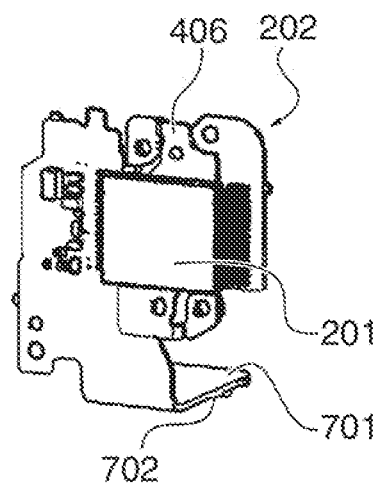
FIG. 8A is a perspective view of a device substrate on which the image pickup device fixed to the sensor plate has been mounted.
Figure 8B:
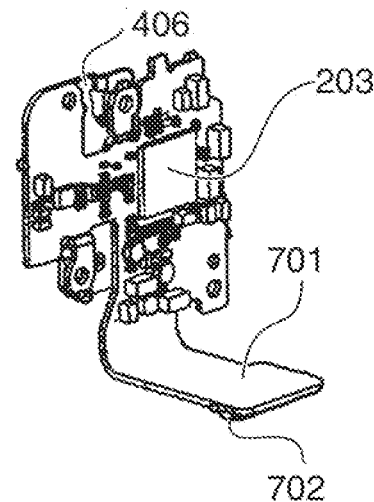
FIG. 8B is a perspective view of FIG. 8A as viewed from a rear side thereof.
Figure 8C:
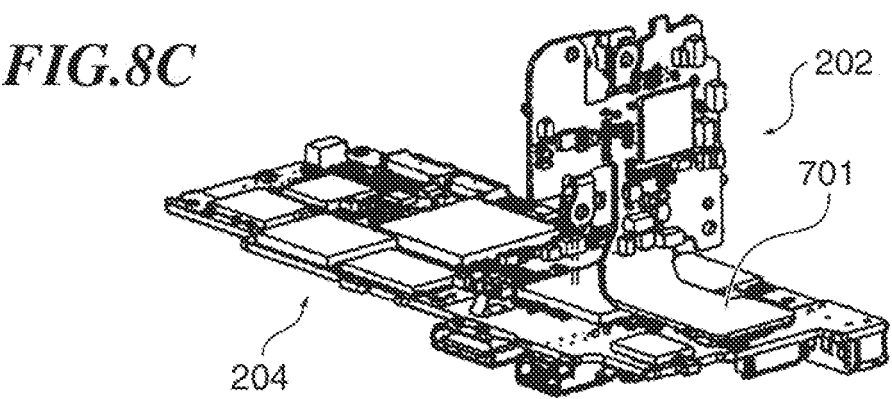
FIG. 8C is a perspective view of a main substrate to which the device substrate is connected.

FIG. 8A is a perspective view of a device substrate 202 on which the image pickup device package 201 having the sensor plate 406 attached thereto has been mounted, and FIG. 8B is a perspective view of FIG. 8A as viewed from a rear side thereof. FIG. 8C is a perspective view of a main substrate 204 to which the device substrate 202 is connected.

On the device substrate 202, an AD converter IC 203 for converting an analog signal photoelectrically converted from an optical image by the image pickup device package 201 to a digital signal, and a peripheral circuit are mounted. The AD converter IC 203 is mounted on a surface of the device substrate 202 opposite from the surface on which the image pickup device package 201 is mounted. A video signal subjected to analog-to-digital conversion by the AD conversion IC 203 mounted on the device substrate 202 is output to the main substrate 204 via a B-to-B connector 702 mounted to a connector mounting part 701.

Figure 9A:
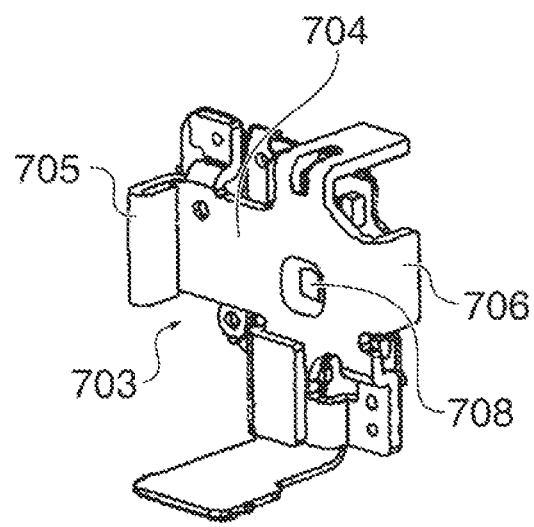
FIG. 9A is a perspective view of the device substrate on which a heat sink is mounted with a screw, as viewed from the rear side of the image pickup device.

FIG. 9A is a perspective view showing a state where a heat sink 703 has been mounted on the device substrate 202 with a screw, as viewed from the rear side of the image pickup device package 201.

The heat sink 703 includes a main surface 704 which is parallel to the device substrate 202, a heat sink arm 705 extending from the main surface 704 backward in the z-axis direction, and a heat sink arm 706 extending from the main surface 704 frontward in the z-axis direction. The heat sink arm 705 is arranged closer to the right-side surface of the camera body 102, and the heat sink arm 706 is arranged closer to the left-side surface of the camera body 102.

Further, an aperture part 708 is formed in the main surface 704 at a location opposed to the AD converter IC 203, which makes it possible to dispose the heat sink 703 close to the AD converter IC 203, whereby it is possible to efficiently release heat from the AD converter IC 203.

Figure 9B:
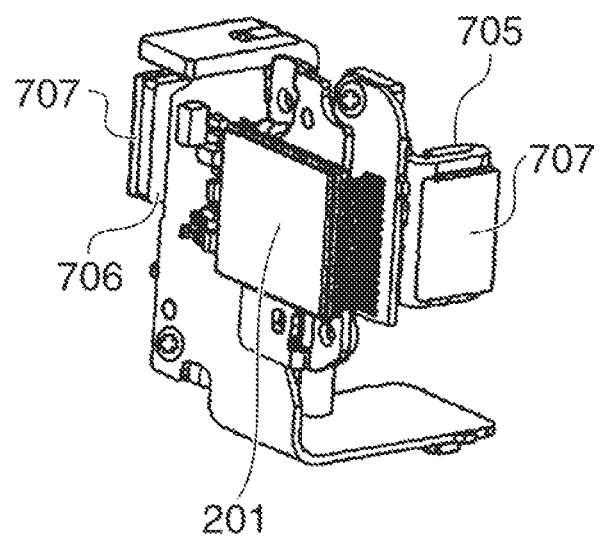
FIG. 9B is a perspective view of the device substrate having elastic conductive heat release members attached to heat sink arms of the heat sink thereof, as viewed from the image pickup device.

FIG. 9B is a perspective view showing a state where elastic conductive heat release members 707 have been attached to the heat sink arms 705 and 706 of the heat sink 703, as viewed from the image pickup device package 201. Each elastic conductive heat release member 707 is configured to be elastically brought into contact with peripheral structural members to perform conduction of electric noise and releasing of heat generated e.g. in the device substrate 202 and the image pickup device package 201.

FIG. 10A is a schematic view of each elastic conductive heat release member 707, and FIG. 10B is a schematic view showing a relationship between the heat sink arms 705 and 706 of the heat sink 703, the elastic conductive heat release members 707, and the peripheral structural members, denoted by reference numeral 805.

Each elastic conductive heat release member 707 is formed by bending a sheet formed by affixing metallic foil 802, such as copper foil or aluminum foil, to a plastic sheet 801 such that the metallic foil 802 faces outward, and sandwiching an elastic member 804 therebetween, such as urethane foam or sponge, to which a double-sided tape 803 is affixed. Note that the plastic sheet 801 which is approximately 0.05 to 0.3 mm in thickness is used, and the metallic foil 802 which is 0.05 to 0.5 mm in thickness is used.

The double-sided tape 803 is affixed to the metallic foil 802 and the plastic sheet 801 such that part of the double-sided tape 803 is exposed, and the elastic conductive heat release members 707 are attached to the heat sink arms 705 and 706 of the heat sink 703, using the exposed part of the double-sided tape 803, respectively.

As shown in FIG. 10B, each elastic conductive heat release member 707 is arranged such that the metallic foil 802 is also opposed to a surface of the structural member 805 on a side opposed to the heat sink arm 705 or 706 of the heat sink 703, and the metallic foil 802 is pressed against the structural member 805, by the elastic member 804, to thereby perform conduction and heat release. Further, each elastic conductive heat release member 707 is substantially U-shaped, and a U-shaped portion 806 is arranged closer to the main surface 704 of the heat sink 703, which is close to the image pickup device package 201 and the device substrate 202 as a heat source, which makes it possible to increase a heat sink effect.

Further, by using the plastic sheet 801 as a member for supporting the metallic foil 802, it is possible to prevent the metallic foil 802 from being plastically deformed so as not to interfere with a repelling force of the elastic member 804. With this arrangement, it is possible to perform both conduction and heat release using one member without using a heat release rubber and a gasket in combination, which makes it possible to reduce costs and save space. Although in the present embodiment, one piece of double-sided tape is used, two pieces of double-side tape may be used to sandwich the elastic member 804, or one piece of long double-sided tape may be used to wrap the elastic member 804.

Figure 11A:
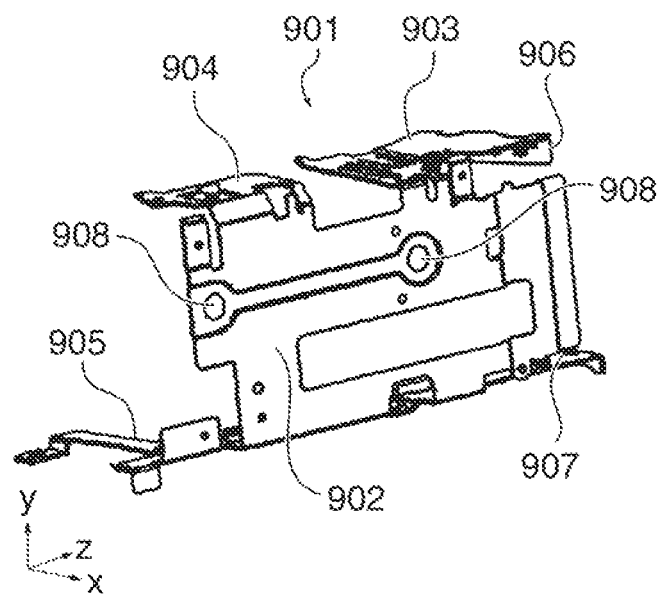
FIG. 11A is a perspective view of the appearance of a right-side sheet metal member.

Next, a right-side sheet metal member 901 disposed between an external cover on the right-side surface of the camera body 102 and the lens barrel 109 will be described with reference to FIGS. 11A and 11B. FIG. 11A is a perspective view of the appearance of the right-side sheet metal member 901, and FIG. 11B is a plan view of the right-side sheet metal member 901, as viewed from above.

The right-side sheet metal member 901 is formed of an aluminum alloy or a copper alloy having high heat conductivity, and has a substantially straight-lined U-shape, including a main-surface portion 902 forming a right-side surface, two top-surface portions 903 and 604 which are disposed away from each other in the front-rear direction (z-axis direction), and a lower-surface portion 905.

Figure 11B:
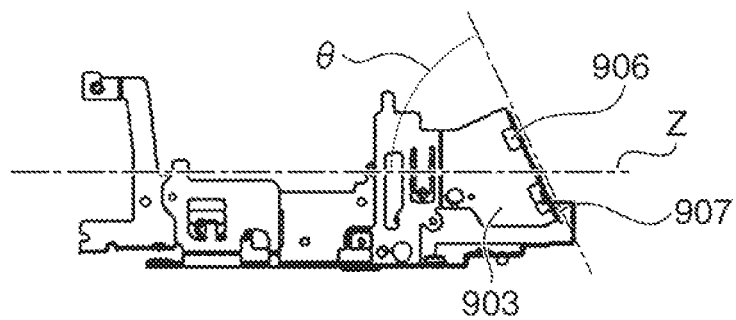
FIG. 11B is a plan view of the right-side sheet metal member, as viewed from above.

As shown in FIG. 11B, the top-surface portion 903 has a rear portion provided with a bending portion 906 which extends in a manner obliquely intersecting with the z-axis at an angle θ of approximately 65 degrees, as viewed from above in plan view, and the lower-surface portion 905 has a rear portion formed with a slit 907 obliquely extends in a manner opposed to the bending portion 906. The main-surface portion 902 of the right-side sheet metal member 901 is formed with two holes 908 in a manner spaced away from each other in the front-rear direction, through which lens receiving elastic members 1001 (see FIGS. 12A and 12B) are fitted, respectively.

Figure 11C:
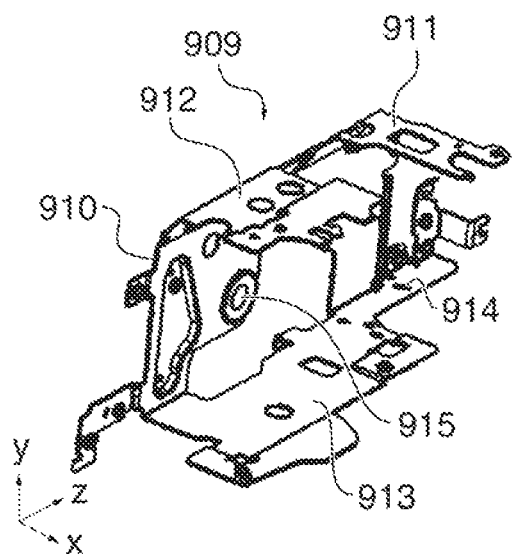
FIG. 11C is a perspective view of the appearance of a left-side sheet metal member.

Next, a left-side sheet metal member 909 disposed between an external cover on the left-side surface of the camera body 102 and the lens barrel 109 will be described with reference to FIG. 11C. FIG. 11C is a perspective view of the appearance of the left-side sheet metal member 909.

The left-side sheet metal member 909 is formed of an aluminum alloy or a copper alloy having high heat conductivity, and has a substantially straight-lined U-shape, including a main-surface portion 910 forming a left-side surface, two top-surface portions 911 and 912 which are arranged away from each other in the front-rear direction (z-axis direction), and a lower-surface portion 913. The lower-surface portion 913 has a rear portion formed with a slit 914 which extends in the same direction as the slit 907 of the right-side sheet metal member 901. The main-surface portion 910 of the left-side sheet metal member 909 is formed with one hole 915, through which the lens receiving elastic member 1001 is fitted.

Figure 12A:
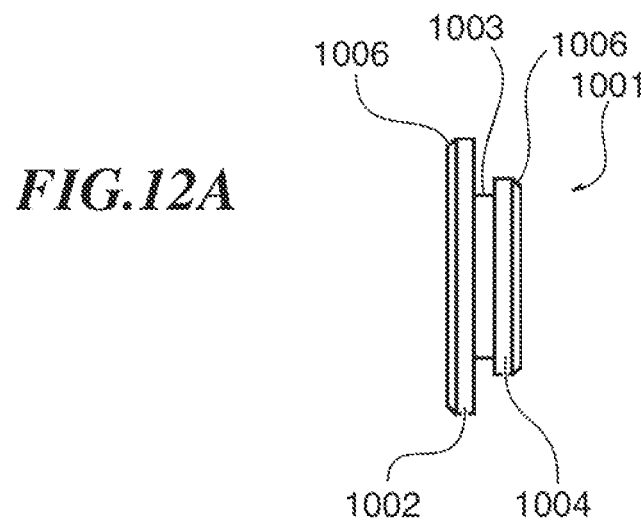
FIG. 12A is a side view of a lens receiving elastic member.
Figure 12B:
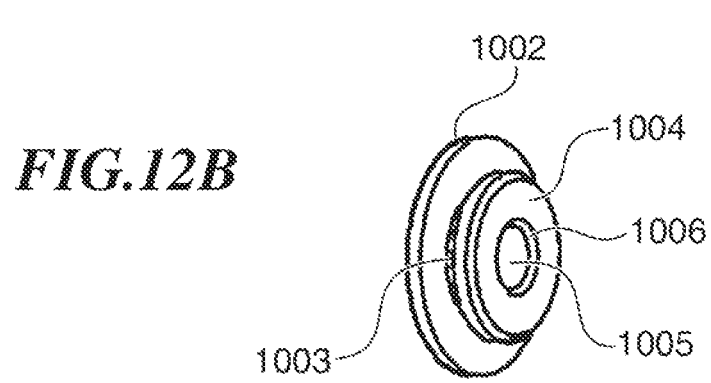
FIG. 12B is a perspective view of the lens receiving elastic member.

FIG. 12A is a side view of the lens receiving elastic member 1001, and FIG. 12B is a perspective view of the lens receiving elastic member 1001.

The lens receiving elastic member 1001 includes a large diameter portion 1002, a small diameter portion 1003, and a medium diameter portion 1004, which are concentrically formed side by side in the axial direction, with a hole 1005 formed through a central portion thereof. Outer peripheries of the large diameter portion 1002 and the medium diameter portion 1004 and inner peripheries of opposite ends of the hole 1005 each have a chamfered portion 1006.

Figure 13A:
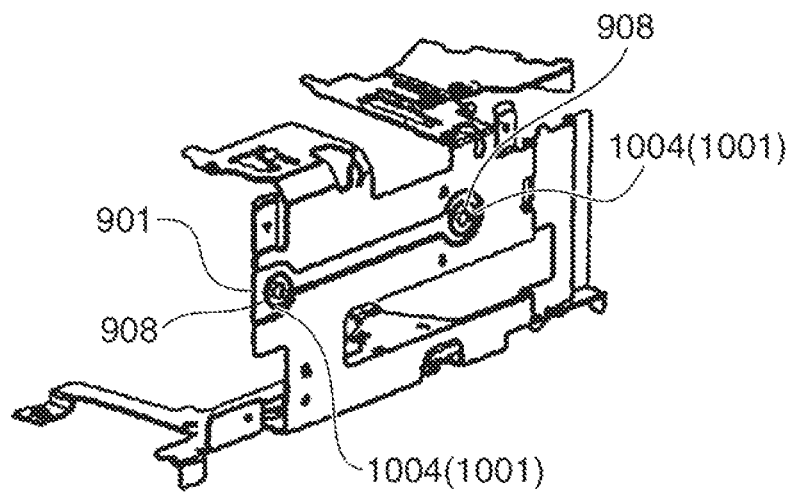
FIG. 13A is a perspective view of the appearance of the right-side sheet metal member having the lens receiving elastic members fitted through two holes thereof, respectively.
Figure 13B:
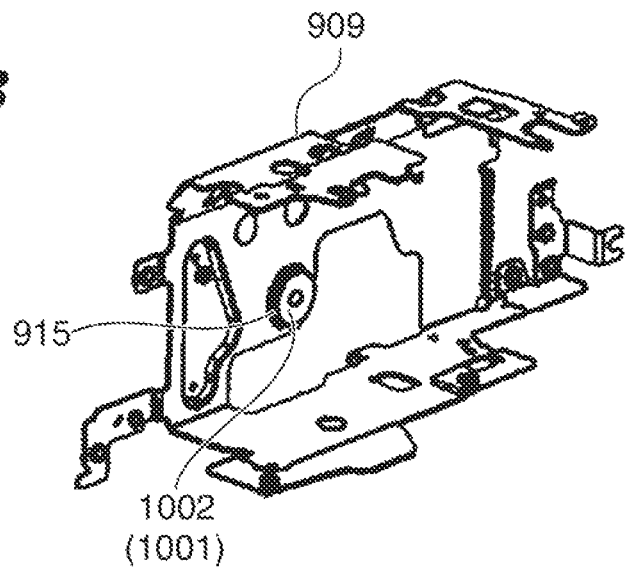
FIG. 13B is a perspective view of the appearance of the left-side sheet metal member having the lens receiving elastic member fitted through a hole thereof.

FIG. 13A is a perspective view of the appearance of the right-side sheet metal member 901 having the lens receiving elastic members 1001 fitted through the two holes 908, respectively, and FIG. 13B is a perspective view of the appearance of the left-side sheet metal member 909 having the lens-receiving elastic member 1001 fitted through the hole 915.

The right-side sheet metal member 901 has the small diameter portion 1003 fitted in each hole 908 thereof such that the large diameter portion 1002 having a large contact area is disposed toward the lens barrel 109, whereby the right-side sheet metal member 901 is sandwiched between the large diameter portion 1002 and the medium diameter portion 1004. Similarly, the left-side sheet metal member 909 has the small diameter portion 1003 fitted in the hole 915 thereof such that the large diameter portion 1002 having the large contact area is disposed toward the lens barrel 109, whereby the left-side sheet metal member 909 is sandwiched between the large diameter portion 1002 and the medium diameter portion 1004.

Figure 14A:
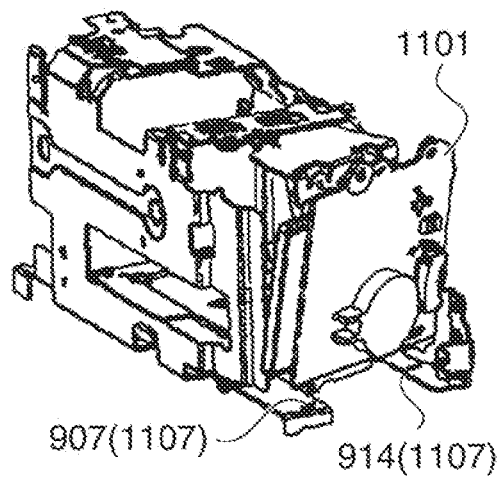
FIG. 14A is a perspective view showing how a card substrate is mounted to a bending portion and a slit of the right-side sheet metal member, and a slit of the left-side sheet metal member.
Figure 14B:
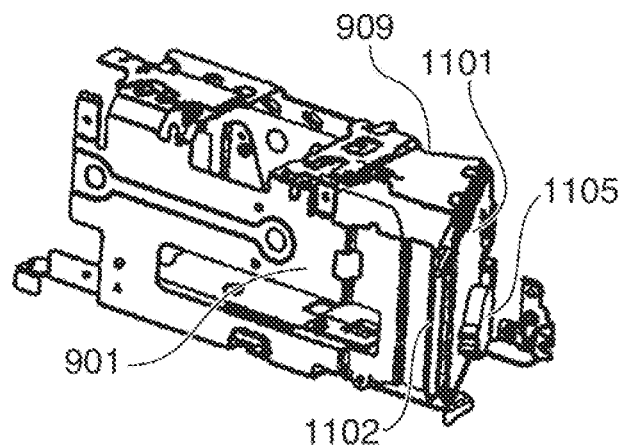
FIG. 14B is a perspective view showing a state where the card substrate has been mounted to the bending portion and the slit of the right-side sheet metal member, and the slit of the left-side sheet metal member.
Figure 14C:
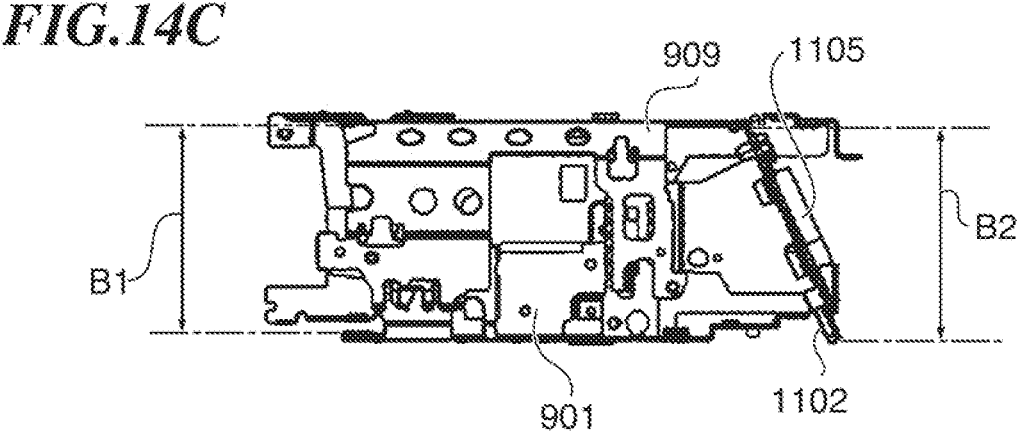
FIG. 14C is a plan view of the state shown in FIG. 14B, as viewed from the above.

FIG. 14A is a perspective view showing how a card substrate 1101 is mounted to the bending portion 906 and the slit 907 of the right-side sheet metal member 901, and the slit 914 of the left-side sheet metal member 909. FIG. 14B is a perspective view showing a state where the card substrate 1101 has been mounted to the bending portion 906 and the slit 907 of the right-side sheet metal member 901, and the slit 914 of the left-side sheet metal member 909, and FIG. 14C is a plan view of FIG. 14B, as viewed from above.

On the card substrate 1101, a card slot 1102 to which an external memory card is connected is mounted. As shown in FIG. 14A, after an insertion portion 1107 formed on the card substrate 1101 is inserted in the slit 907 and the slit 914, the card substrate 1101 is pressed against the bending portion 906, and is fastened with screws, not shown.

Here, as described above, since the bending portion 906, and the two slits 907 and 914 are inclined by approximately 65 degrees with respect to the optical axis z of the lens barrel 109, the card substrate 1101 is also mounted in a manner inclined with respect to the optical axis z.

The right-side sheet metal member 901 and the left-side sheet metal member 909 each are formed into the substantially straight-lined U shape as mentioned above, and hence the structure formed by combining the right-side sheet metal member 901 and the left-side sheet metal member 909 has a rectangular shape in cross-section, which has a problem in strength against parallelogram deformation. However, by obliquely fixing the card substrate 1101, the card substrate 1101 can serve as diagonal bracing to play the role of a reinforcing member.

Further, the inclination angle θ of the card substrate 1101=approximately 65 degrees is determined such that a projected area of the card substrate 1101, as viewed from the direction of the optical axis z, is mostly within the projected area of the lens barrel 109. That is, as shown in FIG. 14C, an image pickup lens holder width B1 formed by the right-side sheet metal member 901 and the left-side sheet metal member 909 is substantially the same as a width B2 of an area occupied by the card substrate 1101 in the direction of the optical axis z.

By determining the inclination angle θ as above, it is possible to make the camera body 102 compact without making the width of the camera body 102 in the left-right direction (x direction) larger than that of a component element determined by the width of the lens barrel 109. Further, the height of the card substrate 1101 in the vertical direction (y-axis direction) is shorter than the width B2 of the card substrate 1101 in the left-right direction (x-axis direction), and falls within the height of the lens barrel 109 in the vertical direction. Further, a backup storage battery 1105 is mounted on a surface of the card substrate 1101 opposite from the surface on which the card slot 1102 is mounted.

Figure 15A:
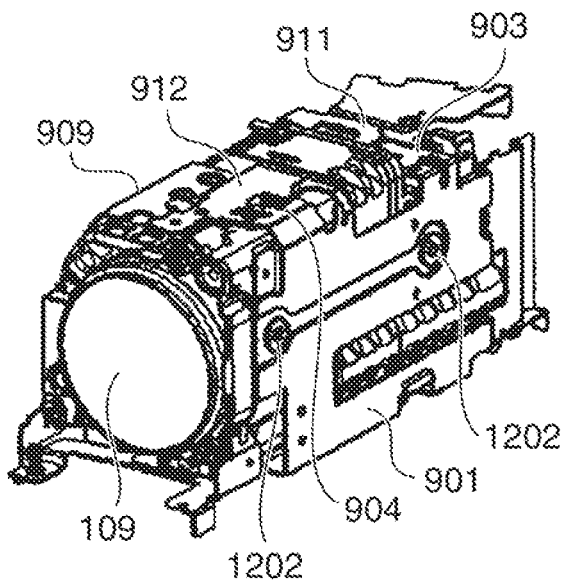
FIG. 15A is a perspective view of the lens barrel having the right-side sheet metal member and the left-side sheet metal member mounted thereon, as viewed from a top side thereof.
Figure 15B:
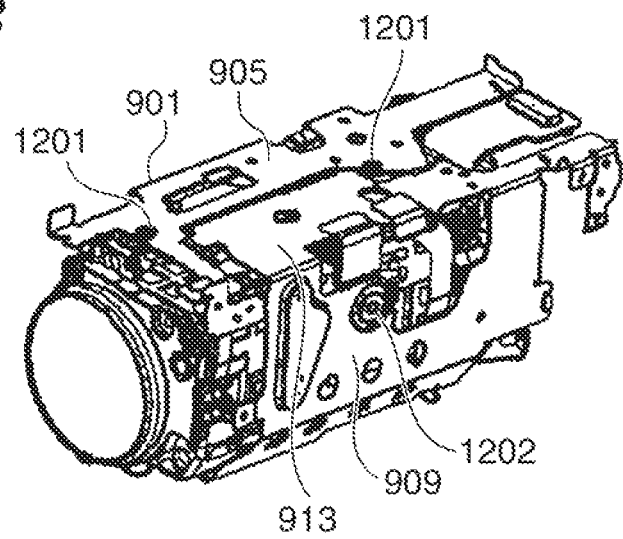
FIG. 15B is a perspective view of the lens barrel having the right-side sheet metal member and the left-side sheet metal member mounted thereon, as viewed from a bottom side thereof.

FIG. 15A is a perspective view of the lens barrel 109 having the right-side sheet metal member 901 and the left-side sheet metal member 909 mounted thereon, as viewed from a top side thereof, and FIG. 15B is a perspective view of the lens barrel 109 having the right-side sheet metal member 901 and the left-side sheet metal member 909 mounted thereon, as viewed from a bottom side thereof.

The lens barrel 109 is formed with shafts 1202 fitted in the respective holes 1005 of the lens receiving elastic members 1001 fitted to the right-side sheet metal member 901 and the left-side sheet metal member 909. The top-surface portion 903 of the right-side sheet metal member 901 and a top-surface portion 911 of the left-side sheet metal member 909 are connected via a hooking lug, not shown, and a top-surface portion 904 of the right-side sheet metal member 901 and the top surface 912 of the left-side sheet metal member 909 are also connected via a hooking lug, not shown. The lower-surface portion 905 of the right-side sheet metal member 901 and the lower-surface portion 913 of the left-side sheet metal member 909 are fastened with screws 1201.

The lens barrel 109 is held only by the elastic force of the lens receiving elastic members 1001 against the structure formed by assembling the right-side sheet metal member 901 and the left-side sheet metal member 909. This makes it possible to make load difficult to be transferred to the lens barrel 109, which is applied e.g. from external members fitted to the right-side sheet metal member 901 and the left-side sheet metal member 909, and further make vibration and noise difficult to be transferred e.g. to the external members, which is generated by the lens barrel 109.

Figure 16A:
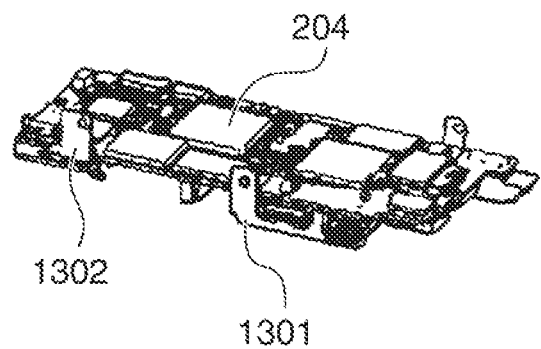
FIG. 16A is a perspective view of the main substrate having a tripod screwing member and a reinforcing sheet metal member assembled thereto.
Figure 16B:
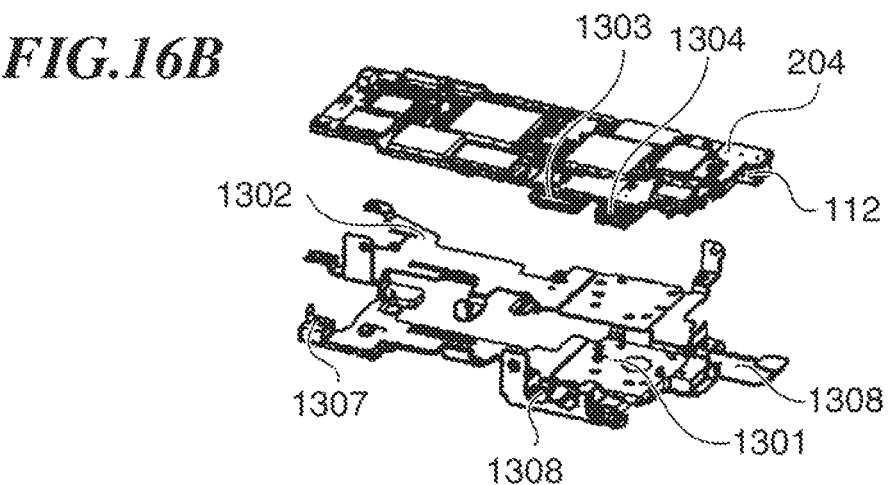
FIG. 16B is an exploded perspective view of FIG. 16A.
Figure 16C:
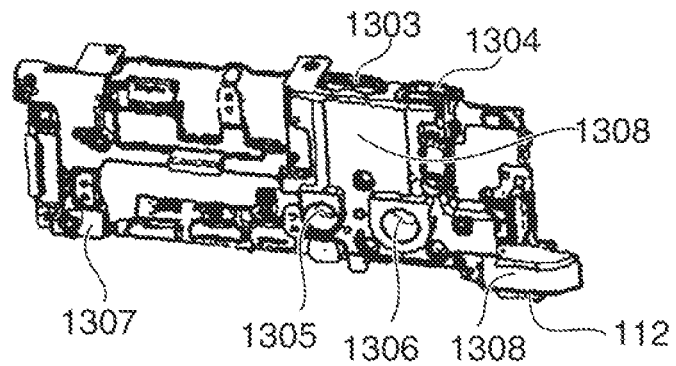
FIG. 16C is a perspective view as viewed from a bottom side of FIG. 16A.

FIG. 16A is a perspective view of a state where a tripod screwing member 1301 and a reinforcing sheet metal member 1302 have been assembled to the main substrate 204, FIG. 16B is an exploded perspective view of FIG. 16A, and FIG. 16C is a perspective view as viewed from a bottom side of FIG. 16A.

The main substrate 204 is mounted on the bottom side of the structure formed by assembling the right-side sheet metal member 901 and the left-side sheet metal member 909, in a state unitized by sandwiching the reinforcing sheet metal member 1302 between the main substrate 204 and the tripod screwing member 1301. To the main substrate 204, not only the above-mentioned image pickup device substrate 202 is connector-connected, but also an FPC (flexible printed-circuit) connected to a drive actuator of the lens barrel 109 and a position detection unit of a driving system, etc. are connected. Further, on the lower surface side of the main substrate 204, an HDMI terminal 1303, a USB terminal 1304, and a power input terminal 112 are mounted.

The tripod screwing member 1301 is formed of e.g. fiber-reinforced plastic, and includes a rotation stopper 1305, a tripod screwing part 1306, a mounting part 1307 for mounting the reinforcing sheet metal member 1302, and a terminal reinforcing part 1308.

The tripod screw part 1306 is formed with a screw to which a tripod is fastened, and the rotation stopper 1305 is formed with a recess in which a rotation stopper protrusion of the tripod is fitted. The upper surface of the tripod screw part 1306 is reinforced by attaching the reinforcing sheet metal member 1302 thereto since an upward thrust force is applied to the tripod screw part 1306 when the tripod is mounted. The terminal reinforcing part 1308 supports and reinforces the surfaces of the HDMI terminal 1303, the USB terminal 1304, and the power input terminal 112, opposite from the surfaces toward the main substrate 204.

Figure 17:
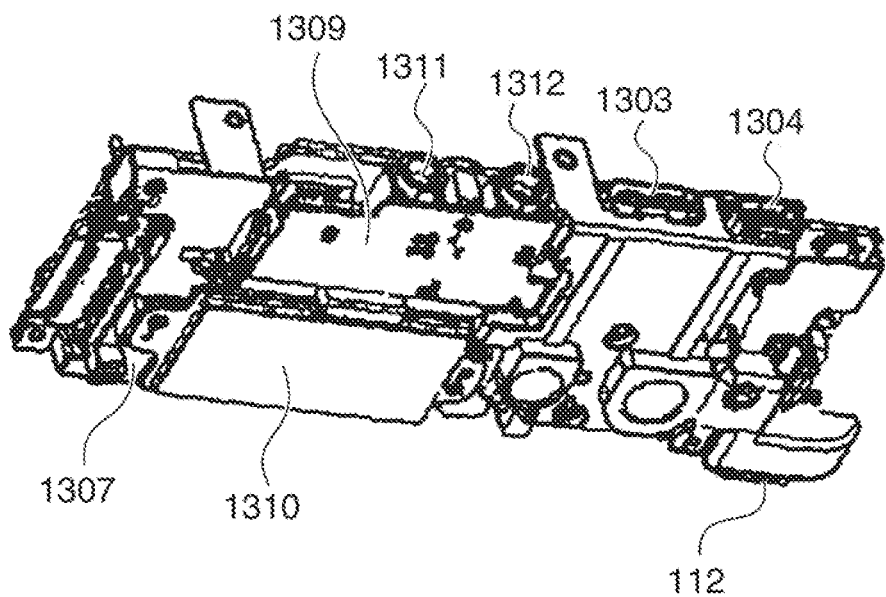
FIG. 17 is a perspective view showing a state where a terminal substrate and a memory substrate have been mounted on the reinforcing sheet metal member of the main substrate shown in FIGS. 16A to 16C.

FIG. 17 is a perspective view showing a state where a terminal substrate 1309 and a memory substrate 1310 have been attached to the reinforcing sheet metal member 1302 of the main substrate unit shown in FIGS. 16A to 16C.

As shown in FIG. 17, the terminal substrate 1309 on which a video/sound output terminal 1311 and an external microphone input terminal 1312 have been mounted, and the memory substrate 1310 on which a built-in memory, not shown, has been mounted are fastened to the reinforcing sheet metal member 1302 of the main substrate unit, respectively, to form a unit.

Figure 18A:
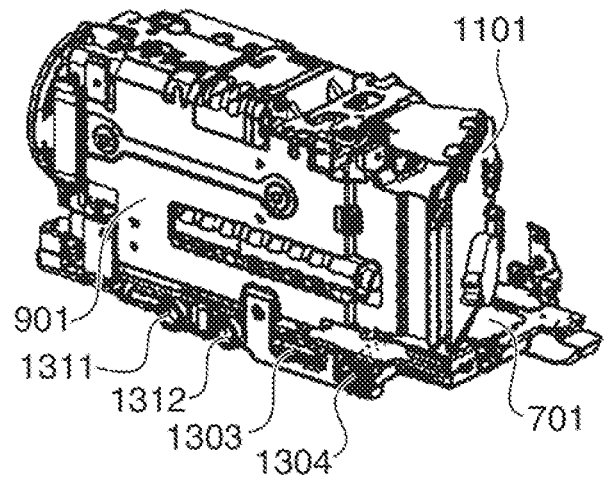
FIG. 18A is a perspective view showing a state where the unit shown in FIG. 17 and the card substrate have been mounted to the unit formed by mounting the right-side sheet metal member and the left-side sheet metal member to the lens barrel, shown in FIGS. 15A and 15B.
Figure 18B:
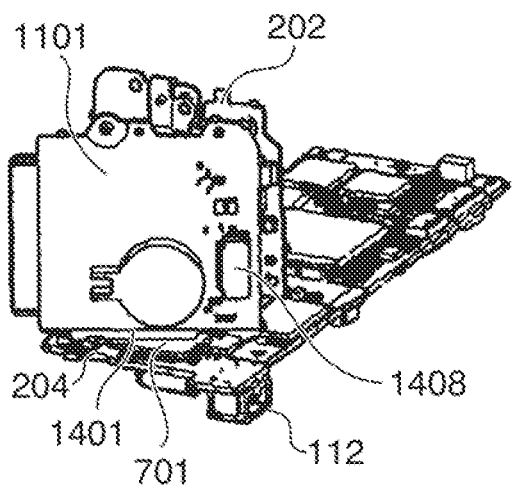
FIG. 18B is a perspective view showing a positional relationship between the device substrate, the main substrate, and the card substrate in the state shown in FIG. 18A.

FIG. 18A is a perspective view showing a state where the unit shown in FIG. 17 and the card substrate 1101 have been mounted to the unit shown in FIGS. 15A and 15B which is formed by attaching the right-side sheet metal member 901 and the left-side sheet metal member 909 to the lens barrel 109. FIG. 18B is a perspective view showing a positional relationship between the device substrate 202, the main substrate 204, and the card substrate 1101 in the state shown in FIG. 18A.

A lower portion of the card substrate 1101 is provided with a protrusion 1401, and a connection part between the B-to-B connector 702 mounted on the connector mounting part 701 of the device substrate 202 and the main substrate 204 is arranged at a location opposed to the protrusion 1401.

Figure 18C:
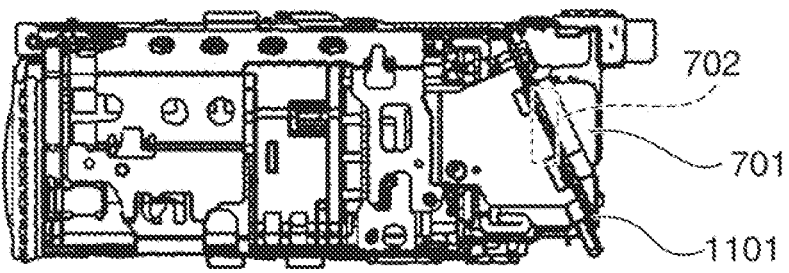
FIG. 18C is a plan view as viewed from a top side of FIG. 18A.

FIG. 18C is a plan view as viewed from a top side of FIG. 18A. As shown in FIG. 18C, the protrusion 1401 is disposed at a location where the card substrate 1101 intersects with the B-to-B connector 702. By disposing the protrusion 1401 as above, it is possible to restrict the B-to-B connector 702 from rotating about the short side or the long side thereof to thereby prevent a contact failure from occurring. Further, the distance between the protrusion 1401 and the connector mounting part 701 of the device substrate 202 is set to be not larger than the amount of fitting of the B-to-B connector 702, whereby it is possible to prevent the B-to-B connector 702 from being carelessly removed.

Figure 19A:
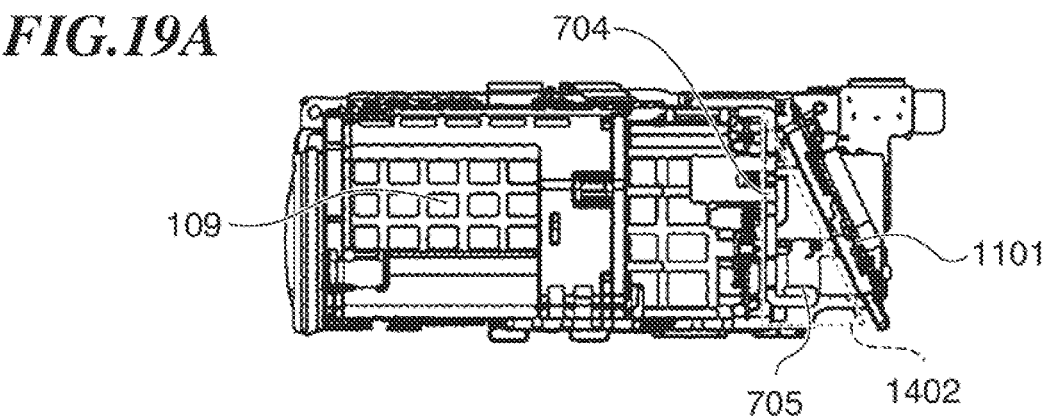
FIG. 19A is a top view showing a positional relationship between the lens barrel, the card substrate, and the heat sink, in the state shown in FIG. 18A.

FIG. 19A is a top view showing a positional relationship between the lens barrel 109, the card substrate 1101, and the heat sink 703, in the state shown in FIG. 18A.

As shown in FIG. 19A, the right heat sink arm 705 of the heat sink 703 is disposed in a triangular space 1402 (part enclosed by a broken line in FIG. 19A) defined between the main surface 704 of the heat sink 703 and the card substrate 1101. By subjecting the heat sink arm 705 to hemming, the triangular space 1402 is used as a heat dissipation space. Further, the backup storage battery 1105 is arranged in a space opposite to the triangular space 1402 across the card substrate 1101 to thereby make effective use of the space.

Figure 19B:
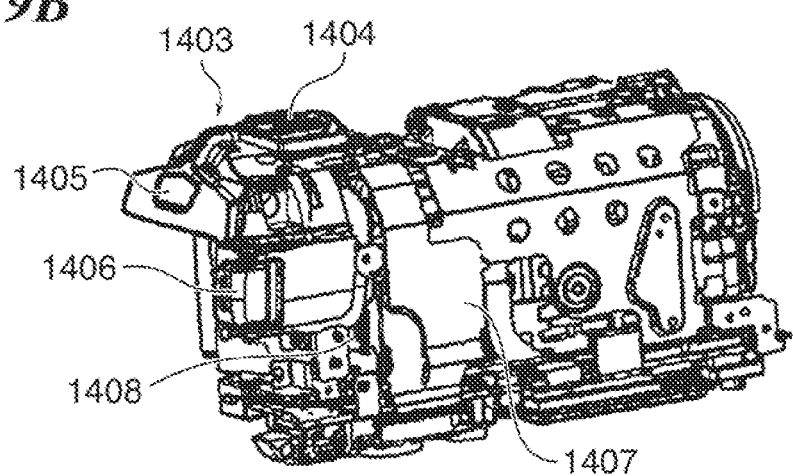
FIG. 19B is a perspective view showing a state where an operation unit has been mounted to a structure shown in FIG. 18A.

FIG. 19B is a perspective view showing a state where an operation unit 1403 has been mounted to a structure shown in FIG. 18A.

The operation unit 1403 is a unit formed by a zoom switch 1404, a power switch 1405, and a recording switch 1406. The operation unit 1403 is mounted on the upper surface of the card substrate 1101 at a location where the right-side sheet metal member 901 and the left-side sheet metal member 909 are fastened to each other on the top side. The operation unit 1403 and the main substrate 204 are connected by an FPC 1407. The FPC 1407 is bifurcated to be connected to a connector 1408 of the card substrate 1101, whereby it is also used to connect the card substrate 1101 and the main substrate 204.

Figure 20A:
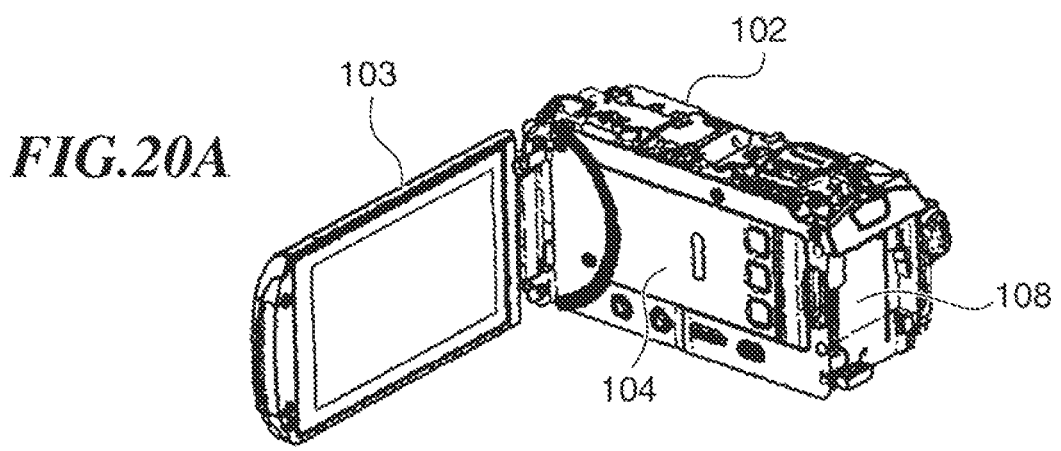
FIG. 20A is a perspective view showing a state where a right-side cover of the camera body and a display unit have been mounted to a structure shown in FIG. 19B.
Figure 20B:
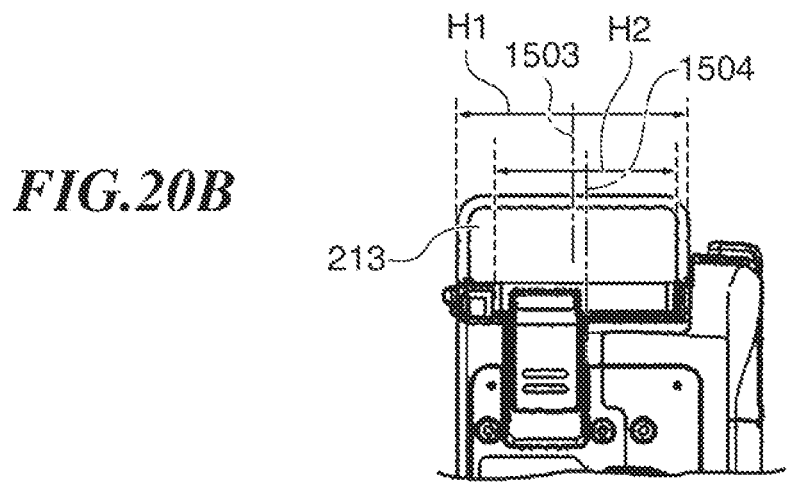
FIG. 20B is a view showing the periphery of a battery on a bottom side of the camera body.
Figure 20C:
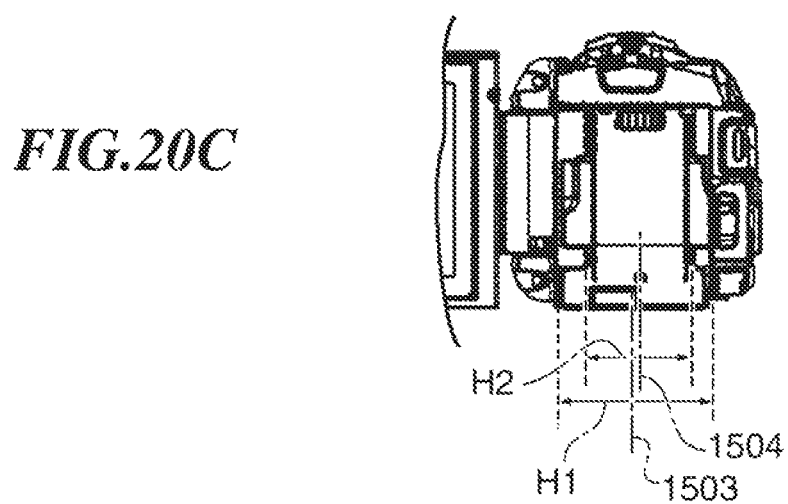
FIG. 20C is a view as viewed from a rear side of FIG. 20A.

FIG. 20A is a perspective view showing a state where a right-side cover 104 of the camera body 102 and the display unit 103 have been mounted to a structure shown in FIG. 19B, and FIG. 20B is a view showing the periphery of a battery on the bottom side of the camera body 102. FIG. 20C is a view as viewed from a rear side of FIG. 20A.

The battery, denoted by reference numeral 213, is mounted on a battery mounting part 108 provided on the rear of the right-side cover 104. When the battery mounting part 108 is viewed from the bottom of the camera body 102, a center 1504 of a mounting rail width H2 is disposed closer to the left-side surface of the camera body 102 than a center 1503 of a maximum horizontal width H1 of the battery mounting part 108.

Figure 21A:
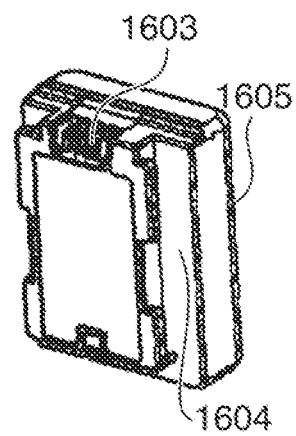
FIG. 21A is a perspective view of the battery.
Figure 21B:
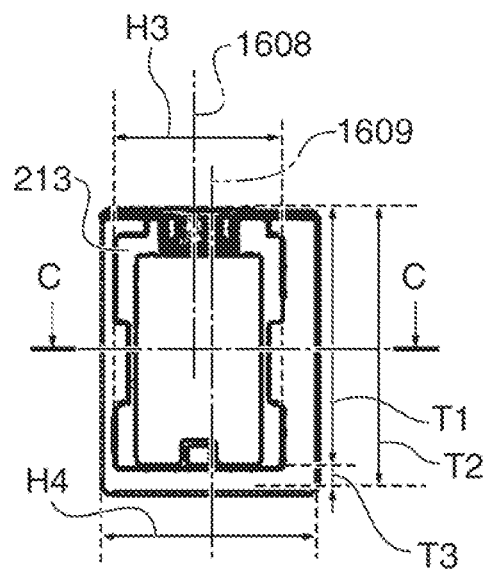
FIG. 21B is a front view of the battery, as viewed from a fitting surface side thereof.
Figure 21C:
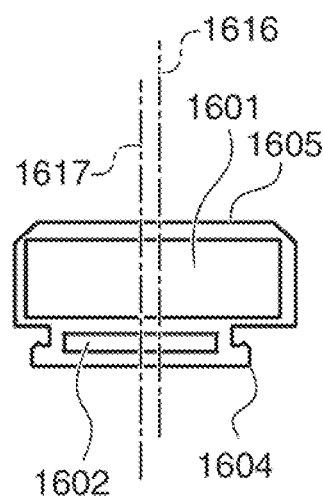
FIG. 21C is a cross-sectional view taken along C—C in FIG. 21B.

FIG. 21A is a perspective view of the battery 213, FIG. 21B is a front view of the battery 213, as viewed from a mounting surface side thereof, and FIG. 21C is a cross-sectional view taken along C—C in FIG. 21B.

The battery 213 is formed by sandwiching a cell 1601 of a lithium-ion battery, a circuit substrate 1602, and a connector 1603, between a mounting part cover 1604 and an external cover 1605. A center 1608 of a horizontal width H3 of a mounting part of the mounting part cover 1604 is disposed in a manner shifted toward the left from a center 1609 of a horizontal width H4 of the mounting part cover 1604 (=a horizontal width of the external cover 1605), as viewed from the mounting surface. This causes, as mentioned above, the center 1504 of the mounting rail width H2 to be disposed closer to the left-side surface of the camera body 102 than the center 1503 of the maximum horizontal width H1 of the battery mounting part 108.

As shown in FIG. 21C, also within the battery 213, a center 1617 of the circuit substrate 1602 is arranged in a manner shifted toward the left with respect to a center 1616 of the cell 1601. Further, the cell 1601 and the circuit substrate 1602 are shifted not only in the left-right direction, but also in a vertical direction as shown in FIG. 21B. That is, a vertical height T1 of the mounting part of the mounting part cover 1604 is shifted toward the top side with respect to a vertical height T2 of the entire mounting part cover 1604 (=vertical height of the external cover 1605), which produces a stepped portion T3.

Figure 22A:
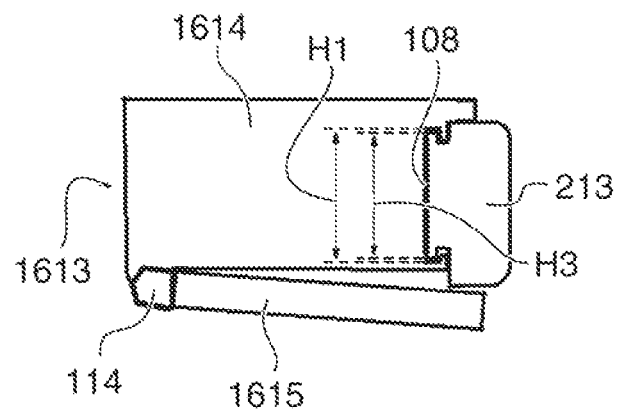
FIG. 22A is a schematic view showing a state where the battery has been fitted to a digital video camera of a type having a small battery mounting part.
Figure 22B:
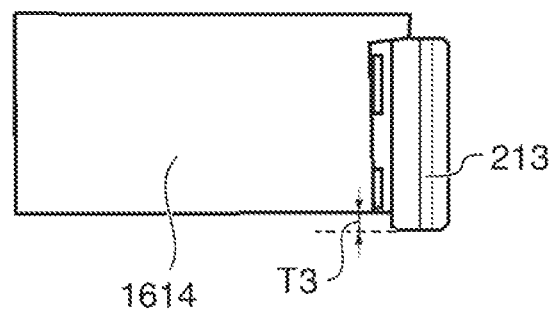
FIG. 22B is a schematic view of the digital video camera, as viewed from a right side of the camera body.

FIG. 22A is a schematic view showing a state where the battery 213 has been mounted on a digital video camera 1613 of a type having a battery mounting part smaller than that of the digital video camera 101 according to the present embodiment. FIG. 22B is a schematic view of the digital video camera 1613, as viewed from the right side of a camera body 1614.

The digital video camera 1613 has a display unit 1615 supported on a right-side surface of the camera body 1614 such that it is pivotal about the biaxial hinge portion 114 in an opening/closing direction, and is vertically rotatable in the opened state. The horizontal width H1 of the battery mounting part 108 provided on the rear of the camera body 1614 is assumed to be substantially the same as the horizontal width H3 (see FIG. 21B) of the mounting part of the battery 213. When the battery 213 is mounted on the above-mentioned battery mounting part 108 of the digital video camera 1613, although the display unit 1615 is not set in a fully-closed state, the battery 213 can be fitted and used.

Further, the vertical height of the battery mounting part 108 of the digital video camera 1613 is assumed to be substantially the same as the vertical height T1 (see FIG. 21B) of the fitting part of the battery 213. Therefore, when the battery 213 is mounted on the battery mounting part 108, as shown in FIG. 22B, although the stepped portion T3 of the battery 213 protrudes from the bottom of the camera body 1614, the battery 213 can be fitted and used.

Figure 23A:
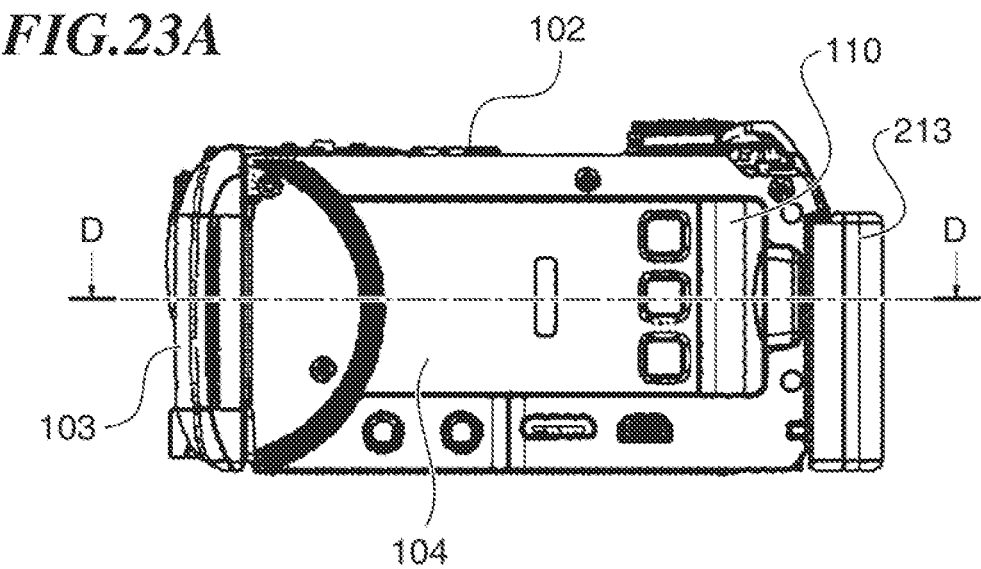
FIG. 23A is a view of the state shown in FIG. 22A, as viewed from the right side of the camera body.
Figure 23B:
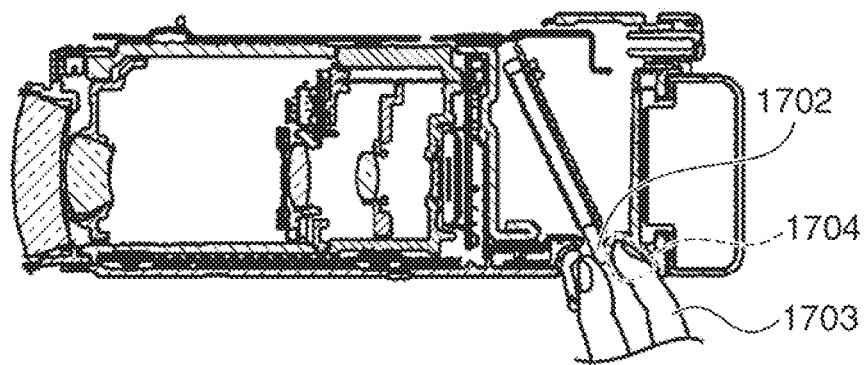
FIG. 23B is a cross-sectional view taken along D—D in FIG. 23A.

FIG. 23A is a view of the state shown in FIG. 22A, as viewed from the right side of the camera body 102, and FIG. 23B is a cross-sectional view taken along D—D in FIG. 23A.

The right-side cover 104 of the camera body 102 is provided with the memory card inlet 110. The card substrate 1101 on which the card slot 1102 is mounted is obliquely disposed as mentioned above, and hence the memory card inlet 110 is also obliquely disposed. Therefore, when a memory card 1702 fitted in the card slot 1102 is pulled out of the memory card inlet 110, as shown in FIG. 23B, the memory card 1702 is pulled out obliquely rearward of the camera body 102.

With this arrangement, if the display unit 103 is in the opened state, the memory card 1702 does not interfere with the display unit 103 at any location on an extension in the direction of pulling out the memory card 1702. The location of the memory card inlet 110 with respect to the battery mounting part 108 in the front-rear direction of the camera body 102 is determined such that the memory card inlet 110 is provided in the vicinity of the battery mounting part 108. Further, since the battery mounting part 108 is disposed in a manner shifted toward the left-side surface of the camera body 102, it is possible to ensure a space 1704 (area surrounded by a broken line in FIG. 23B) for fingers 1703 when the memory card 1702 is to be pulled out.

Figure 24A:
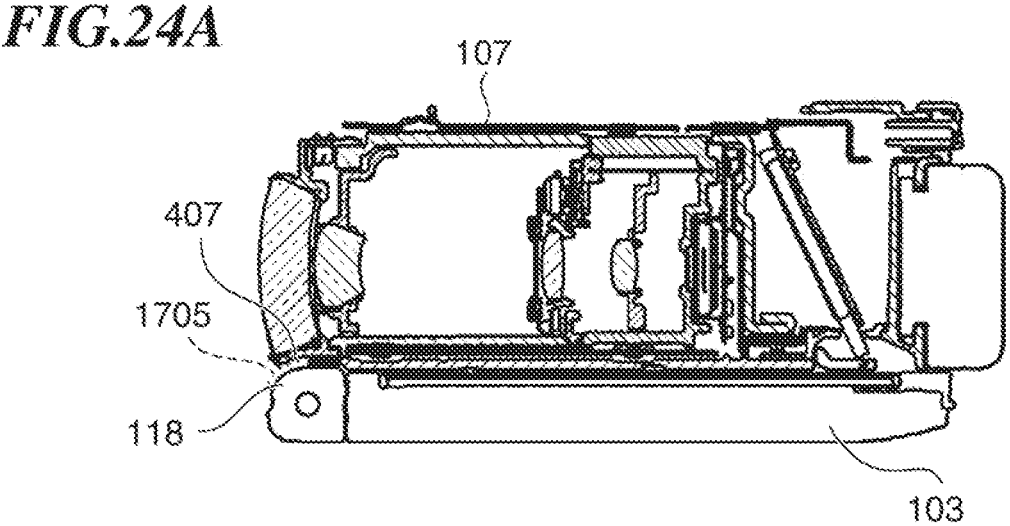
FIG. 24A is a cross-sectional view of the digital video camera in a state where the display unit is closed, as viewed from a top side thereof.
Figure 24B:
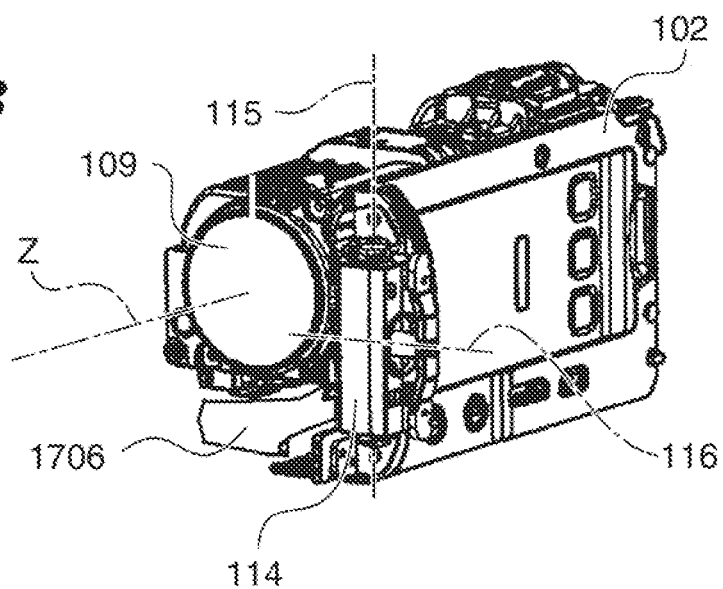
FIG. 24B is a perspective view showing a state where the display unit has been removed from the camera body.

FIG. 24A is a cross-sectional view of the digital video camera 101 in a state where the display unit 103 is closed, as viewed from a top side thereof, and FIG. 24B is a perspective view showing a state where the display unit 103 has been removed from the camera body 102.

As described above, the display unit 103 is mounted to the right-side cover 104 via the biaxial hinge portion 114. A pivotal motion track 1705 of a hinge cover 118 pivoted about an opening/closing axis 115 of the biaxial hinge portion 114 extends along the shape of the cutout 407 of the fixed barrel 301.

With this arrangement, it is possible to arrange the display unit 103 closer to the optical axis z of the lens barrel 109. The digital video camera 101 has a characteristic that as the distance between the optical axis z and the display unit 103 is smaller, the digital video camera 101 looks more compact, and hence it is possible to realize the compact digital video camera 101.

Further, by arranging a vertical rotational axis 116 of the biaxial hinge portion 114 at a location lower than the optical axis z, it is possible to pass a FPC 1706 which connects the display unit 103 and the main substrate 204 under the lens barrel 109. Therefore, it is possible to arrange the display unit 103 closer to the optical axis z than in a case where the FPC 1706 is passed through a space between the display unit 103 and the lens barrel 109.

Figure 25:
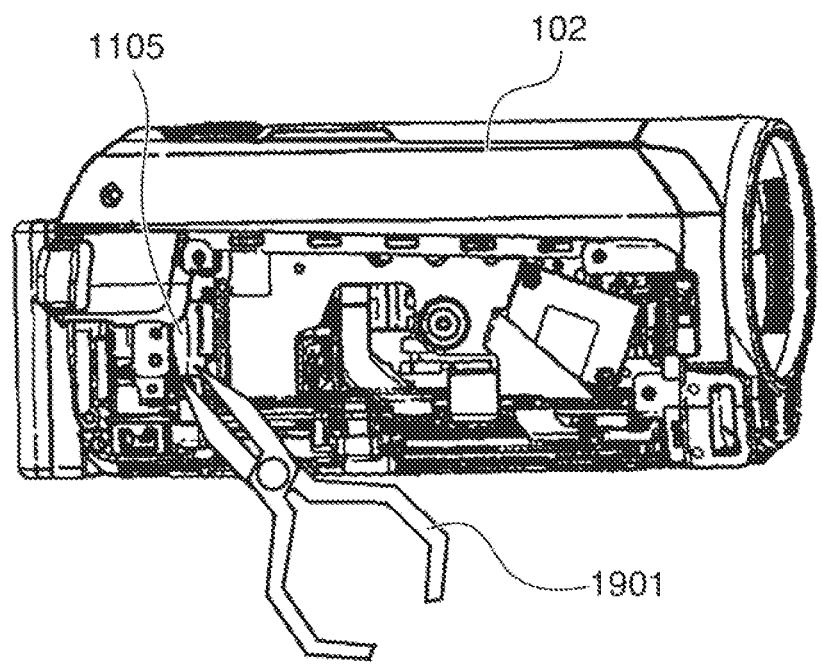
FIG. 25 is a perspective view showing a state where the left-side cover has been removed from the camera body.

FIG. 25 is a perspective view showing a state where a left-side cover 107 (see FIG. 24A) has been removed from the camera body 102. The left-side cover 107 is a part held by a user with his/her right hand, and even when e.g. a screw is exposed, the appearance is less liable to be uglified, and hence the left-side cover 107 is a cover which is assembled in a final process and is often first removed when disassembling the camera body 102.

On the card substrate 1101, as mentioned above, the backup storage battery 1105, such as a lithium-ion battery, is mounted. The layout has been designed such that when the left-side cover 107 has been removed, the backup storage battery 1105 mounted on the card substrate 1101 is easily visible since the card substrate 1101 is obliquely disposed. Therefore, when taking out the backup storage battery 1105, only by removing the left-side cover 107, it is possible to easily pull out the backup storage battery 1105 using a tool 1901, such as a pair of needle-nose pliers.

As described above, in the present embodiment, even when the screw insertion holes 513 of the sensor plate 406 are disposed close to the optical axis z, this does not affect the amount of movement of the optical system, and hence it is possible to reduce the size of the structure for mounting the image pickup device package 201. This makes it possible to reduce the size of the lens barrel 109, and in turn reduce the size of the digital video camera 101.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-281486, filed Dec. 22, 2011 which is hereby incorporated by reference herein in its entirety.

What is claimed is:

1. An image pickup apparatus comprising:
a lens barrel;
an image pickup device package configured to convert an optical image having passed through an optical system of the lens barrel to an electric signal; and
a fixing member configured to have the image pickup device package attached thereto, and be fixed to the lens barrel,
wherein the fixing member has an attachment surface to which the image pickup device package is attached, a fixing surface which is fixed to the lens barrel, and a stepped portion is formed between the attachment surface and the fixing surface,
wherein the attachment surface is brought into abutment with the lens barrel to thereby have the said fixing member positioned in an optical axis direction, and the fixing surface is fixed to the lens barrel, and
wherein the fixing member has a first opening formed in the stepped portion.

2. The image pickup apparatus according to claim 1, wherein the attachment surface and the fixing surfaces are formed such that a gap is produced between the fixing surface and the lens barrel in a state after the attachment surface has been brought into abutment with the lens barrel and before the fixing surfaces is fixed to the lens barrel.

3. The image pickup apparatus according to claim 1, wherein the attachment surface has second openings formed therethrough, for exposing a rear surface of the image pickup device package, and
wherein the rear surface of the image pickup device package is brought into abutment with the attachment surface, and then an adhesive is applied to the second openings, whereby the image pickup device package is bonded and fixed to the attachment surface.

4. The image pickup apparatus according to claim 1, wherein the second opening is formed such that a distance from a position corresponding to the center of an optical axis to a first corner of the second opening is shorter than a distance from the position corresponding to the center of the optical axis to a second corner of the second opening far from the first opening, and
wherein the first corner of the second opening is closer to the first opening than the second opening far from the first opening.

* * * * *